United States Patent
Tran et al.

(10) Patent No.: US 12,383,958 B2
(45) Date of Patent: Aug. 12, 2025

(54) MONITORING SYSTEM AND METHOD OF IDENTIFICATION OF ANOMALIES IN A 3D PRINTING PROCESS

(71) Applicant: NANYANG TECHNOLOGICAL UNIVERSITY, Singapore (SG)

(72) Inventors: Anh Tuan Tran, Singapore (SG); Ngoc Vu Nguyen, Singapore (SG); Jun Wee Allen Hum, Singapore (SG); Chee How Wong, Singapore (SG); Qingyang Lu, Singapore (SG)

(73) Assignee: NANYANG TECHNOLOGICAL UNIVERSITY, Singapore (SG)

( * ) Notice: Subject to any disclaimer, the term of this patent is extended or adjusted under 35 U.S.C. 154(b) by 860 days.

(21) Appl. No.: 17/438,688

(22) PCT Filed: Mar. 13, 2020

(86) PCT No.: PCT/SG2020/050136
§ 371 (c)(1),
(2) Date: Sep. 13, 2021

(87) PCT Pub. No.: WO2020/185169
PCT Pub. Date: Sep. 17, 2020

(65) Prior Publication Data
US 2022/0143704 A1 May 12, 2022

(30) Foreign Application Priority Data
Mar. 13, 2019 (SG) .......................... 10201902249X

(51) Int. Cl.
*B22F 10/80* (2021.01)
*B22F 10/00* (2021.01)
(Continued)

(52) U.S. Cl.
CPC .............. *B22F 10/80* (2021.01); *B22F 10/00* (2021.01); *B22F 10/38* (2021.01); *B22F 10/85* (2021.01);
(Continued)

(58) Field of Classification Search
None
See application file for complete search history.

(56) References Cited

U.S. PATENT DOCUMENTS 11,311,943 B2 * 4/2022 Nassar .................... B22F 10/25
2009/0206065 A1 8/2009 Kruth et al.
(Continued)

FOREIGN PATENT DOCUMENTS

CN 110174408 A 8/2019

OTHER PUBLICATIONS

Grasso M. et.al., [Process Defects and In-situ Monitoring Methods in Metal Powder Bed Fusion: a Review, Measurement Science and Technology, Feb. 15, 2017, vol. 28, No. 4, pp. 1-40 ] (Year: 2017).*

(Continued)

*Primary Examiner* — Lina Cordero
(74) *Attorney, Agent, or Firm* — Alston & Bird LLP

(57) ABSTRACT

A monitoring system for in-situ identification of anomalies of a workpiece in a 3D printing manufacturing process is provided. The monitoring system includes an optical sensor having an optical path; an infrared sensor having an IR path; an optical device configured to merge the optical and the IR paths to obtain a merged optical path, which is arranged to be directed to the workpiece during a first stage of a 3D printing manufacturing process to obtain a first perception data; and a processor configured to identify anomalies of the workpiece based on the first perception data. A method is also provided. The method includes steps of: merging an optical path of an optical sensor and an infrared path of an (Continued)

IR sensor using an optical device to obtain a merged path; directing the merged path to the workpiece during a first stage of a 3D printing manufacturing process to obtain a first perception data; and identifying anomalies of the workpiece based on the first perception data.

18 Claims, 20 Drawing Sheets

(51) Int. Cl.
| | |
|---|---|
| B22F 10/28 | (2021.01) |
| B22F 10/38 | (2021.01) |
| B22F 10/85 | (2021.01) |
| B22F 12/90 | (2021.01) |
| B33Y 10/00 | (2015.01) |
| B33Y 50/00 | (2015.01) |
| B33Y 50/02 | (2015.01) |
| G01N 21/88 | (2006.01) |

(52) U.S. Cl.
CPC .............. *B22F 12/90* (2021.01); *B33Y 50/02* (2014.12); *G01N 21/8851* (2013.01); *B22F 10/28* (2021.01); *B33Y 10/00* (2014.12); *B33Y 50/00* (2014.12)

(56) References Cited

U.S. PATENT DOCUMENTS

| | | | |
|---|---|---|---|
| 2016/0184893 A1 | 6/2016 | Dave et al. | |
| 2017/0001379 A1* | 1/2017 | Long | B29C 64/393 |
| 2017/0146488 A1 | 5/2017 | Gold et al. | |
| 2017/0368640 A1* | 12/2017 | Herzog | B23K 26/034 |
| 2018/0104742 A1 | 4/2018 | Kottilingam et al. | |
| 2019/0039318 A1 | 2/2019 | Madigan et al. | |
| 2019/0039319 A1* | 2/2019 | Bechmann | B22F 10/32 |
| 2019/0086899 A1* | 3/2019 | Wang | B33Y 50/02 |
| 2019/0176396 A1* | 6/2019 | Bokkes | B22F 12/44 |
| 2019/0202129 A1* | 7/2019 | Herzog | B33Y 10/00 |
| 2019/0329354 A1* | 10/2019 | Deforge | B22F 12/224 |
| 2021/0078076 A1* | 3/2021 | Jurg | B22F 12/90 |

OTHER PUBLICATIONS

Clijsters, S., Craeghs, T., Buls, S. et al. In situ quality control of the selective laser melting process using a high-speed, real-time melt pool monitoring system. Int J Adv Manuf Technol 75, 1089-1101 (2014). https://doi.org/10.1007/s00170-014-6214-8 (Year: 2014).*
J. zur Jacobsmihlen et al., "Elevated region area measurement for quantitative analysis of laser beam melting process stability." (Year: 2015).*
Kelly, S.M. et al., In-Process Sensing of Laser Powder Bed Fusion Additive Manufacturing, A Workshop on Predictive Theoretical and Computational Approaches for Additive Manufacturing (Year: 2015).*
Lane, B. et al., "Thermographic measurements of the commercial laser powder bed fusion process at NIST," Rapid prototyping journal, vol. 22, No. 5, pp. 778-787, 2016.
J. zur Jacobsmühlen et al., "Elevated region area measurement for quantitative analysis of laser beam melting process stability."
Grasso, M. et al., "In-process monitoring of selective laser melting: Spatial detection of defects via image data analysis," Journal of Manufacturing Science and Engineering, vol. 139, No. 5, pp. 051001, 2017.
Mani, M. et al., "Measurement science needs for real-time control of additive manufacturing powder bed fusion processes" US Department of Commerce, National Institute of Standards and Technology, 2015.
Takushima, S. et al., *Optical in-process height measurement system for process control of laser metal-wire deposition.* Precision Engineering, 2020. 62: p. 23-29.
Heralić, A. et al., *Height control of laser metal-wire deposition based on iterative learning control and 3D scanning.* Optics and lasers in engineering, 2012. 50(9): p. 1230-1241.
Donadello, S., et al., *Monitoring of laser metal deposition height by means of coaxial laser triangulation.* Optics and Lasers in Engineering, 2019. 112: p. 136-144.
Hua, T., et al., *Research on molten pool temperature in the process of laser rapid forming.* Journal of Materials Processing Technology, 2008. 198(1-3): p. 454-462.
Yu, J., et al., *Mechanics and energy analysis on molten pool spreading during laser solid forming.* Applied Surface Science, 2010. 256(14): p. 4612-4620.
Nassar, A.R., et al., *Intra-layer closed-loop control of build plan during directed energy additive manufacturing of Ti-6Al-4V.* Additive Manufacturing, 2015. 6: p. 39-52.
Hu, D. et al., *Sensing, modeling and control for laser-based additive manufacturing.* International Journal of Machine Tools and Manufacture, 2003. 43(1): p. 51-60.
Zalameda, J.N. et al. *Thermal imaging for assessment of electron-beam freeform fabrication (EBF3) additive manufacturing deposits.* in Thermosense: Thermal Infrared Applications XXXV. 2013. International Society for Optics and Photonics.
Liu, S. et al., *Real-time monitoring of laser hot-wire cladding of Inconel 625.* Optics & Laser Technology, 2014. 62: p. 124-134.
Grasso M. et al., *Process Defects and In-situ Monitoring Methods in Metal Powder Bed Fusion: a Review.* Measurement Science and Technology, Feb. 15, 2017, vol. 28, No. 4, pp. 1-40.
Lane B. et al., *Multiple Sensor Detection of Process Phenomena in Laser Powder Bed Fusion.* Proceedings of SPIE Thermosense: Thermal Infrared Applications XXXVIII, May 11, 2016, vol. 9861, No. 986104, pp. 1-9.
Roberson D.M., "*Sensor-based Online Process Monitoring in Advance Manufacturing*" Aug. 8, 2016 https://vtechworks.lib.vt.edu/bitstream/handle/10919/72911/Roberson_Dm_T_2016.pdf?sequence=1 &isAllowed=y].
Clijsters, S. et al., "*In situ quality control of the selective laser melting process using a high-speed, real-time melt pool monitoring system,*" The International Journal of Advanced Manufacturing Technology, Aug. 10, 2014, vol. 75, pp. 1089-1101.
Thomas G.S. et al., "*In-process sensing in selective laser melting (SLM) additive manufacturing.*" Integrating Materials and Manufacturing Innovation, Feb. 11, 2016, vol. 5, pp. 16-40.
Craeghs T. et al., *Feedback control of Layerwise Laser Melting using optical sensors.*, Dec. 31, 2010, vol. 5, No. B, pp. 505-514.
Kelly, S.M. et al., *In-Process Sensing of Laser Powder Bed Fusion Additive Manufacturing,* A Workshop on Predictive Theoretical and Computational Approaches for Additive Manufacturing.
International Search Report and Written Opinion for PCT/SG2020/050136 (ISA/SG) mailed Jun. 15, 2020.
Chivel, Y., "*Optical in-process temperature monitoring of selective laser melting,*" Physics Procedia, vol. 41, pp. 904-910, 2013.
Yadroitsev, I et al., "*Selective laser melting of Ti6Al4V alloy for biomedical applications: Temperature monitoring and microstructural evolution,*" Journal of Alloys and Compounds, vol. 583, pp. 404-409, 2014.
Lott, P. et al., "*Design of an optical system for the in situ process monitoring of selective laser melting (SLM),*" Physics Procedia, vol. 12, pp. 683-690, 2011.
Thombansen, U., "*Process observation in fiber laser-based selective laser melting,*" Optical Engineering, vol. 54, No. 1, pp. 011008, 2014.
Krauss, H., "*Layerwise monitoring of the selective laser melting process by thermography,*" Physics Procedia, vol. 56, pp. 64-71, 2014.

* cited by examiner

| Sample | I | II | III | IV | V | VI | VII | VIII | IX | X |
|---|---|---|---|---|---|---|---|---|---|---|
| Laser power (W) | $0.5P$ | $P$ | $P$ | $2P$ | $P$ | $1.5P$ | $P$ | $2P$ | $2P$ | $2P$ |
| Scanning speed (mms$^{-1}$) | $V$ | $2V$ | $V$ | $2V$ | $0.67V$ | $V$ | $0.5V$ | $V$ | $0.67V$ | $0.5V$ |
| Energy density factor | $0.5E$ | $0.5E$ | $1.0E$ | $1.0E$ | $1.5E$ | $1.5E$ | $2.0E$ | $2.0E$ | $3.0E$ | $4.0E$ |

In-process monitoring of the printing process

Optical recording    Temperature recording

Defect detection and classification using Convolutional Neural Networks (CNN)

MONITORING SYSTEM AND METHOD OF IDENTIFICATION OF ANOMALIES IN A 3D PRINTING PROCESS

CROSS-REFERENCE TO RELATED APPLICATIONS

This application is a national phase entry of PCT/SG2020/050136, filed on 13 Mar. 2020, which claims the benefit of priority of Singapore Patent Application No. 10201902249X, filed on 13 Mar. 2019, the contents of which being hereby incorporated by reference in their entirety for all purposes.

TECHNICAL FIELD

An aspect of the disclosure relates to a monitoring system for in-situ identification of anomalies of a workpiece in a 3D printing manufacturing process. Another aspect of the disclosure relates to a method of in-situ identification of anomalies of a workpiece in a 3D printing manufacturing process.

BACKGROUND

The present disclosure relates generally to a method and devices for monitoring an additive manufacturing process; in particular, a Powder Bed Fusion (PBF) process, or a directed energy deposition process (DED) process. The PBF process involves the periodic deposition of powder material over previous layers, layer creation by fusing material powder and subsequent powder deposition, for example, after lowering the build platform. The deposition system may comprise of a moving roller or a blade together with a hopper aside the bed which provides fresh material supply. The PBF process uses a directed energy source to melt and fuse material powder on the build platform layer by layer in which two-dimensional sections of the three-dimensional object are formed.

While the PBF technology has a great market potential, the inconsistency in quality and reliability of PBF products is one of the critical limitations that prevents it from being commercially accepted by many manufacturers, especially those that require certification of products. During the PBF process, defects of PBF parts could arise due to a myriad of reasons.

These process instabilities lead to local structural weakness and consequently cause the build-up of elevated regions on the scanned layer, which endangers structural integrity of PBF product. These elevated regions are not covered by subsequent powder deposition and may collide with the recoater blade. Upon contact with the elevated surface, powder deposited by the recoater blade may spring forward and flick, causing a non-uniform powder layer. Severe elevations may cause damage of the recoater blade or even process breakdown by blocking movement of the recoater blade. The discovery of structural weakness using post-process inspection methods on the manufactured part is costly in term of the resources, money and time invested.

Several monitoring systems of PBF process have been developed and commercialized. Kruth et al. (1) describes a coaxial imaging system which measures the geometry quantity of the melt zone for process control. A high-speed CMOS camera and a photodiode have been integrated to an in-house developed SLM machine. A semi permeable mirror is used to deflect laser wavelength (1064 nm) toward the laser source and transmit the melt zone signals at another wavelength range (780-950 nm). The melt zone signals are separated by a beam splitter and are captured by the two sensors. As the line of sight of the camera and photodiode pass through the beam deflection unit, the laser spot and melt pool can be observed at all times, irrespective to the movement of the laser spot. In other systems, the melt zone intensity is acquired by a two-wavelength pyrometer (2, 3) instead of the photodiode sensor. Lott et al. (4) and Thombansen et al. (5) introduce a co-axial illumination source and a pre-focusing unit such that the focal plane is the same for various wavelengths of interested signals. Other authors proposed the use of off-axial imaging system for in-situ monitoring of PBF process in which the captured signal could be either in the visible range or in the IR range depending on different monitoring purposes; for example, thermogram of heat affected zone along the scan path (6, 7), inhomogeneity of the powder bed (8, 9). Aside from Co-axial and Off-axial approaches for in-situ process monitoring, Gold et al. (10) illustrated the used of acoustics sensor to measure the acoustics profile of the melt-pool. The position of the acoustic signal was tracked by correlating the profile with the X, Y and Z position of the SLM machine. Such approaches are not able to identify the anomaly types due to lack of perception information.

All the above mentioned setups are only able to monitor either thermal information (e.g. temperature intensity, melt pool size and shape) or vision based information (surface pattern, powder bed homogeneity) of PBF process with a particular type of anomaly. The coaxial monitoring approach is able to capture position-related characteristics of the melt pool when the part is being fabricated. Nevertheless, this configuration requires complicated modification of the optical components of PBF system as the monitored signals are captured through the f-O lens. In addition, the field of view is constrained to the moving melt pool that is being scanned by the f-O lens. The thermal distribution of surrounding areas and thermal history of the cooled down surface are not inspected. Another limitation of this approach is that it is only applicable for laser PBF system which exploits the f-O lens to guide the optical path of laser beam and selected signals. PBF system using electron beam as energy source cannot utilize this configuration because it uses electron magnetic coils to deflect the electron beam.

According to the report of the National Institute of Standards and Technology (NIST) (10), the process signatures of a PBF system can be categorized depending on the scale of process observation which are the melt pool, the track along the scan path, the slice and the powder bed. Current off-axial systems are mainly developed for measuring the quantity of a particular category of defects and its most relevant process signature.

During DED process, various types of defect could arise when one of the process parameters is not optimized. In blown powder DED, material discontinuities may form during fabrication process due to lack of fusion between layers or entrapping of protective gas within the melt pool. In metal wire DED, surface unevenness or wire tubbing may happen when the gap between the print head and material deposition location is not optimized. In addition, residue stress may exist in the built part due excessive energy input or powder contamination.

Several process monitoring techniques were developed to provide quality control for DED process, for example, height measurement of fused areas using optical imaging sensor (12-14), melt pool monitoring using pyrometer (15-17) or temperature variation using thermal imaging sensor (8-10). All the above mentioned setups are only able to monitor either thermal information (e.g., temperature intensity, melt pool size and shape) or vision based information (surface topology, roughness) of DED process with a particular type of defect.

Thus, there is a need for a comprehensive approach that can capture a range of process defects and establish the relationships between anomalies and quality-control metric of the fabricated product. The present disclosure helps to improve PBF and DED processes' stability and quality management by in-situ detection of critical errors and identification of anomalies, such as anomaly types, arising during the process.

SUMMARY

The present disclosure exploits the combination of sensor fusion methodology using an optical sensor and an infrared (IR) sensor to provide a multi-control approach for in-situ observation of a range of anomaly types and identification the effect of various anomaly types on the quality of 3D printed products. This approach may be system independent and does not require any modification of the optical components of a 3D printing system, making it flexible for installation. Furthermore, the in-situ monitoring system described here is demonstrated to be capable of correlating the image based measurements from anomalies with quality-control metric of 3D printed products.

An aspect of the disclosure relates to a monitoring system for in-situ identification of anomalies of a workpiece in a 3D printing manufacturing process. The monitoring system may include a processor. The monitoring system may further include an optical sensor having an optical path. The monitoring system may further include an IR sensor having an IR path. The monitoring system may further include an optical device configured to merge the optical path and the IR path to obtain a merged optical path. The merged optical path may be arranged to be directed to the workpiece during a first stage of a 3D printing manufacturing process to obtain a first perception data. The processor may be configured to identify anomalies of the workpiece based on the first perception data.

An aspect of the disclosure relates to a method of in-situ identification of anomalies of a workpiece in a 3D printing manufacturing process. The method may include merging an optical path of an optical sensor and an IR path of an IR sensor using an optical device to obtain a merged optical path. The method may include directing the merged optical path to the workpiece during a first stage of a 3D printing manufacturing process to obtain a first perception data. The method may further include identifying anomalies of the workpiece based on the first perception data using a processor.

BRIEF DESCRIPTION OF THE DRAWINGS

The invention will be better understood with reference to the detailed description when considered in conjunction with the non-limiting examples and the accompanying drawings, in which:

FIG. 5A: (i): unprocessed image of layer 9. (ii): HiPE algorithm applied to the scanned layer. (iii): HiPE applied to the recoated layer. (iv): AND operation of (ii) and (iii). (v): unprocessed image of layer 19. (vi): HiPE algorithm applied to the scanned layer. (vii): HiPE applied to the recoated layer. AND operation of (vii) and (viii); FIG. 5B: FIG. 5b: Layer 184 after laser scanned. (i): unprocessed image. (ii): HiPE algorithm applied to the scanned layer. (iii): HiPE algorithm applied to the recoated layer. (iv). AND operation of (ii) and (iii).

FIG. 5C: layer(n) 9 after laser scanned with 350 W laser power and 367 mm/s scanning velocity. (i): unprocessed after scanned image. (ii): LoPE algorithm applied to image (i). (iii): unprocessed after coated image (i). (iv): LoPE algorithm applied to image (iii). (v): AND operator of image (ii) with (iv); FIG. 5D: Layer(n) 198 and 199 after laser scanned with 175 W laser power and 550 mm/s scanning velocity. (i): unprocessed after scanned layer 199 and HiPE algorithm applied. (ii): unprocessed after scanned layer 198 and HiPE algorithm applied. (iii): AND operator of image (i) and (ii).

FIG. 6 shows an exemplary flowchart and FIG. 6B shows exemplary images of feature extraction based on absolute difference, in accordance with various embodiments;

DETAILED DESCRIPTION

Figure 1:
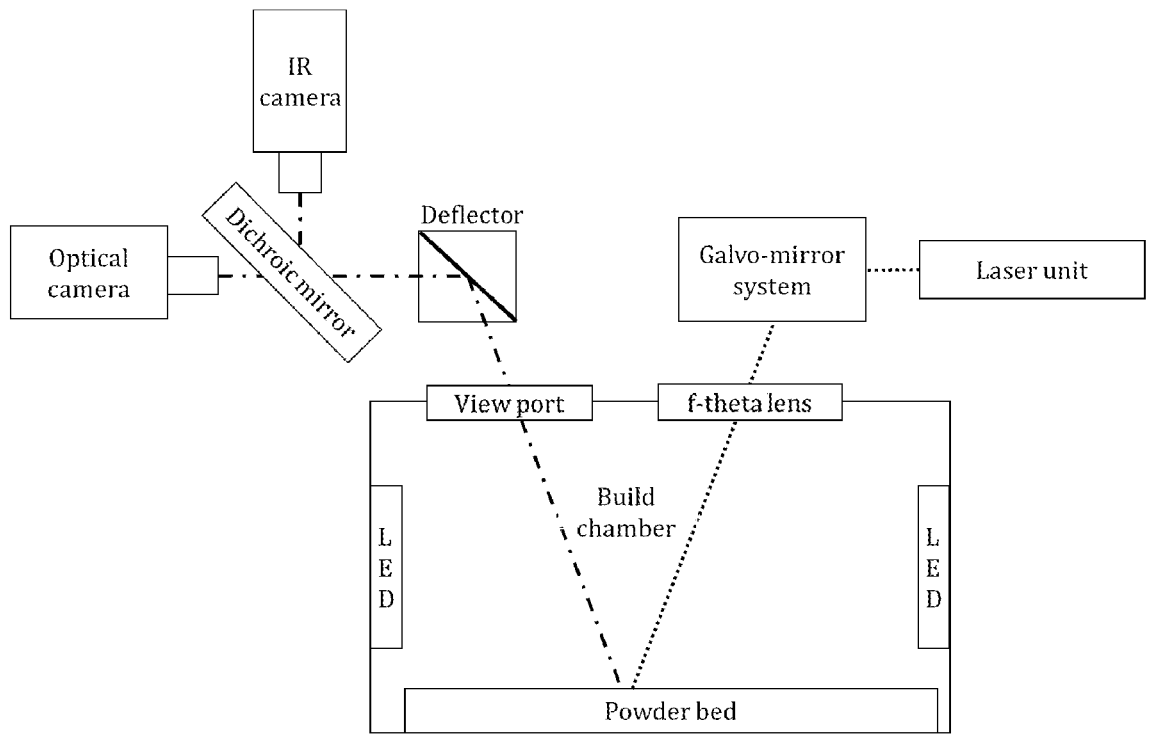
FIG. 1 shows an exemplary schematic representation of a 3D printing equipment including a system in accordance with various embodiments.

The following detailed description refers to the accompanying drawings that show, by way of illustration, specific details and embodiments in which the disclosure may be practiced. These embodiments are described in sufficient detail to enable those skilled in the art to practice the disclosure. Other embodiments may be utilized and structural, and logical changes may be made without departing from the scope of the disclosure. The various embodiments are not necessarily mutually exclusive, as some embodiments can be combined with one or more other embodiments to form new embodiments.

Embodiments described in the context of one of the systems or methods are analogously valid for the other systems or methods. Similarly, embodiments described in the context of a system are analogously valid for a method, and vice-versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

As used herein, and in the context of various embodiments, the articles "a", "an" and "the" as used with regard to a feature or element include a reference to one or more of the features or elements.

As used herein, and in the context of various embodiments, the term "and/or" includes any and all combinations of one or more of the associated listed items.

As used herein, and in the context of various embodiments, perception data (e.g. first perception data, second perception data) may include an optical image, and may further include an IR image. The optical image may be used to obtain visual features, for example structural features, or optical properties, such as surface reflection. The IR image may be used as image, for example as a 2D array of intensity values. Alternatively or in addition, the IR image may be used to obtain thermal data, for example, the thermal data may be a 2D array of temperatures.

As used herein, and in the context of various embodiments, the optical data or the optical images may be data corresponding to information obtained in the visible spectrum.

As used herein, and in the context of various embodiments, the optical sensor may be a sensor able to capture image in the visible spectrum.

The expression "visible spectrum", as used herein and according to various embodiments, may be defined as light having wavelength in vacuum from 380 nm to 780 nm.

As used herein, and in the context of various embodiments, the IR data or the IR images may be data corresponding to information obtained in the IR spectrum.

As used herein, and in the context of various embodiments, the IR sensor may be a sensor able to capture image in the IR spectrum.

The term "infrared" (or simply IR), as used herein (for example in "IR spectrum") and according to various embodiments, may be defined as light having a wavelength in vacuum longer than 800 nm and shorter or equal to 8 micrometer, for example from 3 micrometer to 8 micrometer. The term "infrared" may include the near infrared. For example, an IR sensor may be a near infrared sensor.

According to various embodiments of the system, the 3D printing manufacturing process may be a powder bed fusion process. Alternatively, the 3D printing manufacturing process may be a directed energy deposition process.

The present disclosure relates to a method and system for identification of anomalies of a workpiece in a 3D printing manufacturing process. For example, the 3D printing manufacturing process may be a Powder Bed Fusion (PBF) process in which energy beam, for example a laser or an electron beam, is used to melt and fuse material powder together to form a solid workpiece layer by layer. For example, the material powder may include or consist of metal and may be metal powder, and the solid workpiece may include or consist of metal. The PBF process involves the periodic deposition of powder material over previous layers, layer creation by fusing material powder and subsequent powder deposition, for example, after lowering the build platform. The deposition system may include of a moving roller or a blade together with a hopper aside the bed which provides fresh material supply. The PBF process uses a directed energy source, such as a laser or electron beam, to melt and fuse material powder on the build platform layer by layer in which two-dimensional sections of the three-dimensional object are formed.

Alternatively, the 3D printing manufacturing process may be a directed energy deposition process (DED) process in which a focused energy source directly melts blow powder or wire at the print head (nozzle) to form the workpiece on a substrate. For example, the powder or the wire may include or consist of metal, and the solid workpiece may include or consist of metal.

According to various embodiments of the system, the workpiece may include a plurality of layers, and the processor may be configured to identify anomalies in at least one layer of the plurality of layers.

The approach of various embodiments is sensor fusion methodology using an optical sensor and an infrared (IR) sensor. The optical paths of the optical sensor and IR sensor may be merged together, for example using a beam splitter (BS), to acquire the same or overlapping Field of View (FoV) of a build platform. This approach allows the detection of surface anomalies and identification of anomaly types (e.g. elevated areas, low energy input or overheated regions) from the IR data from the IR sensor (e.g. a thermal map) and the optical data from the optical sensor of every layer in the entire build job. The discovery of structural weakness using post-process inspection methods on the manufactured part is costly in term of the resources, money and time invested. Therefore, in-situ detection of structural weakness arising from manufacturing fault leads to a more efficient 3D printing manufacturing process. The in-situ monitoring method and system described herein was demonstrated to be capable of correlating the image based measurements from anomaly types with quality-control metric of the built part (e.g. density and mechanical strength). The image based measurements of internal defects are also validated against measurements using Computed Tomography (CT) imaging technique.

The principle of DED process, to some extent, is similar to Powder Bed Fusion (PBF) process in which a focused energy source is used to melt and fuse material powder together to form a solid workpiece layer by layer. The key difference between DED and PBF process is that for the DED process, the focused energy source directly melts blow powder or wire being supplied at a print head (nozzle) exit to form a solid part (i.e., the workpiece) on a substrate instead of melting powder materials pre-deposited on a bed as in the PBF process. The proposed in-situ monitoring system can provide a holistic approach for the inspection of DED process by exploiting the sensor fusion methodology described in previous document to detect surface anomalies and various defect signatures in DED process (porosity, cracks, lack of fusion or wire stubbing) from one or more of the IR data, thermal map, and the optical data of every layer in the entire build job. This improves DED process's stability and quality management by in-situ detection of critical errors and identification of defect signatures arising during DED process. Furthermore, the in-situ monitoring system helps to reduce wastage in resources and time invested by providing alarm for the quality of a workpiece being fabricated, for example, when the workpiece does not satisfy the quality criteria.

According to various embodiments, the optical device, the optical sensor and the IR sensor may be arranged in relation to each other as an optical arrangement, e.g., attached to or being part of a 3D printing equipment, such that the optical device merges the optical path and the IR path to obtain a merged optical path. The optical device may be configured to merge the optical path and the IR path to obtain a merged optical path, and may be, for example, a beam splitter, such as a dichroic mirror. The optical arrangement may be further such that the merged optical path is arranged to be directed to the workpiece, for example to be directed downwards in a vertical or at an absolute angle of less than 90° from the vertical. The optical device may be configured to merge the optical path and the IR path to obtain a merged optical path, the merged optical path arranged to be directed to the workpiece during a first stage of the 3D printing manufacturing process to obtain a first perception data. A schematic example of the optical arrangement is shown in FIG. 1. FIG. 1 is a schematic representation of a 3D printing equipment including a system in accordance with various embodiments. The 3D printing equipment of FIG. 1 is a PBF equipment for illustration purposes. The PBF equipment may include a build chamber which may include a building platform surrounded by a building wall. The PBF equipment may include a laser unit, and a galvo-mirror system for directing the laser beam through an f-theta lens towards the powder bed (and the workpiece). The PBF equipment may include a powder bed in the build chamber. The build chamber may further include LEDs for illumination of the interior of the build chamber, for example for illumination of the powder bed. The build chamber may further include a viewport, such a view port may be pre-existing or may be added to a pre-existing 3D printing equipment.

The monitoring system may include an optical sensor having an optical path, illustrated in FIG. 1 as an optical camera. The monitoring system may further include an IR sensor having an IR path, illustrated in FIG. 1 as an IR camera. Both the IR and optical sensor may be mounted on top of the build chamber. Further the optical arrangement may be mounted on top of the build chamber. The optical device configured to merge the optical path and the IR path to obtain a merged optical path is illustrated in FIG. 1 as a dichroic mirror. The merged optical path may be arranged to be directed to the workpiece, for example via a deflector. The merged optical path may be directed to the workpiece during a first stage of a 3D printing manufacturing process to obtain a first perception data. Various embodiments may employ the IR sensor and the optical sensor to acquire perception data of a localized region on the building platform. The perception data for the optical sensor may be one of, but is not limited to, surface topologies, anomalies of the powder bed, or anomalies of the powder bed in the workpiece. The perception information for the IR sensor are not limited to temperature distribution of the built artefact and the powder bed within the localize region. The localized region may be constrained by the field of view (FOV) of the optical device and the deflector. The FOV may also depend on the total OP distance traveled from the sensor to the powder bed or building platform, the size of the BS and deflector, and the lenses used. While certain embodiments are explained in connection with PBF, features may be equally applicable to DED, and vice-versa. In the case of DED, the perception information may represent the workpiece layers, and may include the foreground features, in some embodiments concerning DED, background features may not be necessary, and masking may not be necessary.

According to various embodiments, the optical sensor may be an imaging sensor, for example including a 2 dimensional arrangement of pixels, for example including more than 1 million pixels. Examples of optical sensor are the sensors of a monochromatic or a color digital camera, in which case the system may include the monochromatic or the color digital camera. An exemplary optical sensor has a size of 23 mm×15 mm. The optical sensor may be the optical sensor of a Digital Single Lens Reflex camera (DSLR). The optical sensor may be configured to measure light in the visible spectrum, for example with wavelength from 400 nanometers to 700 nanometers. A lens may be attached to the optical sensor (e.g., via a housing). The lens may include, for example, a focal length of up to 300 mm, such as up to 200 mm. According to various embodiments, images may be provided with an optical resolution, for example, from 5 micrometer/pixel to 20 micrometer/pixel. For example, using a lens with a focal length of 200 mm, and a magnification of 0.38~0.45, a resolution of 10-13 micrometer/pixel may be obtained. The disclosure is not limited to above embodiments and examples.

According to various embodiments, the IR sensor may be an imaging sensor, for example including a 2 dimensional arrangement of pixels, for example including more than 300000 pixels. The IR sensor may be configured to measure infrared light, in the IR spectrum, for example with wavelengths from 3 micrometer to 15 micrometer, such as mid IR wavelength from 3 micrometer to 8 micrometer. One exemplary sensor has a size of 9.6 mm×7.7 mm and includes 640×512 pixel. A lens may be attached to the IR sensor (e.g., via a housing). The lens may include, for example, a focal length of up to 70 mm, for example of up to 50 mm. The disclosure is not limited to above embodiments and examples.

According to various embodiments, the IR sensor may be calibrated with actual temperature profile of the powder bed with reference to specific materials and process parameters (for PBF) or actual temperature of distribution of the build chamber with reference to specific materials and process parameters (for DED). Calibration allows the reduction of errors when using IR data. Background noise of IR light and emissivity of different materials with different process parameters may also be taken into account to obtain thermal data within an appropriate level of certainty.

The total optical path length for the merged optical path may be, for example, between 400 mm and 600 mm, such as 585 mm, however, the disclosure is not limited thereto.

According to various embodiments, the optical paths (OP) of the IR and optical sensors may be merged via an optical device, for example a dichroic beam splitter. The optical device is able to transmit in a first wavelength range (for example, visible wavelength) and reflect in a second wavelength range (for example, IR wavelength, such as short to mid IR). The merged optical path (MOP) may be deflected by a deflector, for example, a mirror or a 45° angle deflector. The deflector may be configured to reflect wavelength in the visible wavelength and in the IR wavelength, for example from the visible wavelengths to the mid IR wavelengths. In one example, the BS has a size of 0.787 cm×0.787 cm (2 inches×2 inches). In one example, the BS has a size of 0.787 cm×0.787 cm (2 inches×2 inches). The disclosure is not limited to above embodiments and examples.

According to various embodiments, the MOP may travel pass a view port. The view port, e.g. of diameter 75 mm, may be the view port originally used for a low-resolution optical sensor provided by the SLM machine manufactured for monitoring the build process, thus already available on the build chamber. If no view port is originally provided, or if the original material of the view port window is made of glass, which blocks all the IR wavelength, it may to be provided or replaced by a view port which is transparent both in the visible spectrum as in the IR spectrum, for example: germanium, AMTIR, Calcium Fluoride, or Zink Selenide (mid IR range permissively material) made window.

According to various embodiments of the system, a system may be configured to identify the type of anomaly based on one or both the first perception data and the second perception data. For example, for a PBF process, the first perception data may include the optical and IR images taken at two different stages or layers, for example the first perception data may include the optical and IR images taken after laser scanning fusion and before a subsequent powder layer is deposited and the second subsequent data may include the optical and IR images taken after a powder layer is deposited and before a subsequent laser scanning fusion, or vice-versa. For example, for a DED process, the first perception data may include the optical and IR images taken at two different stages or layers during different stages of the 3D printing manufacturing process, for example a first perception data at a first stage (e.g. during formation of the "printed track"), and a second perception data at a second stage after the first stage which may be in different layers (e.g., during formation of the "printing track"). However, the disclosure is not limited thereto and other stages may also be used as first and second perception data. The first and/or second perception data is not limited to aforementioned stages but may also include other printing activities such as material deposition, material fusing, solidification and cooling of fused areas.

For example, for a DED process, the first perception data may include the optical and IR images taken at two different layers, for example the first perception data may include the optical and IR images taken after deposition of a first layer and the second subsequent data may include the optical and IR images taken after deposition of a second layer.

The first and/or second perception data may be taken automatically through a sensor, such as a photointerrupter installed on a side wall of the build chamber. A photointerrupter may include a light emitter and a light receiver unit aligned facing each other. The recoater may block the light beam of the photointerrupter momentarily due to its movement from the back to the front of the build chamber, and vice-versa, as it recoats after each printed layer. The photointerrupter changes its state (for example its electrical state) every time it detects light blockage and a signal will be then sent to a script to trigger the optical and IR sensors for data acquisition.

According to various embodiments, anomalies of a workpiece may be classified into anomaly types, or also simply named herein as types of anomaly (or the singular form). Anomalies may represent defects in the workpiece, or indicate the presence of defects in the workpiece. It is understood that "anomaly signatures", or simply "anomalies", as detected according to various embodiments are indications of the presence of defects, for example the methods of detecting anomalies may have an accuracy of 95% or 98%.

According to various embodiments, anomalies are deviations from the intended process and/or workpiece. According to various embodiments, causes of anomalies may be, for example, a variation in the size of powder particles; complex heat transfer; non-uniformity in metal powder deposition for a printing layer; non-uniformity in the weld bead due to variation in laser power, chamber temperature, chamber gas concentrations; local geometry of the part being printed; or non-optimal printing conditions such as scanning speed, laser power. A cause for an anomaly may be an anomaly itself, e.g., a variation in the size of powder particles may also cause a non-uniformity in metal powder deposition. Anomalies, may be anomalies of the foreground, thus corresponding to the workpiece, or to the background (the non-workpiece area), which may be used and/or assist into identifying anomalies of the foreground.

Exemplary anomaly types are: overheating region, metal vaporization, balling effect, discontinuities (e.g., discontinuous melt track), elevation, residue stress, cracks, thermal residual stress, voids, inclusion, pores, heat distribution, non-uniform powder deposition, drag trace. These may be anomalies obtained from IR images, for example of a scanned and/or a recoated layer in a powder bed fusion process. The perception data for the IR images are not limited to temperature distribution of the built artefact.

Exemplary anomaly types may also be: spatter, surface topology, vibration trace, traces obtained from collision of recoater with topological elevations, drag trace, uneven powder distribution (e.g. due to a damaged recoater blade), surface unevenness, lack of fusion, re-deposition of by-product, breaking off part from workpiece features during recoating, entrenchment in vertical and/or horizontal direction. These may be anomalies obtained from optical images, for example of a scanned and/or a recoated layer in a powder bed fusion process. The perception data for the optical images are not limited to surface topologies, anomalies and defects on either the fusing area or the solidified area.

Figure 2:
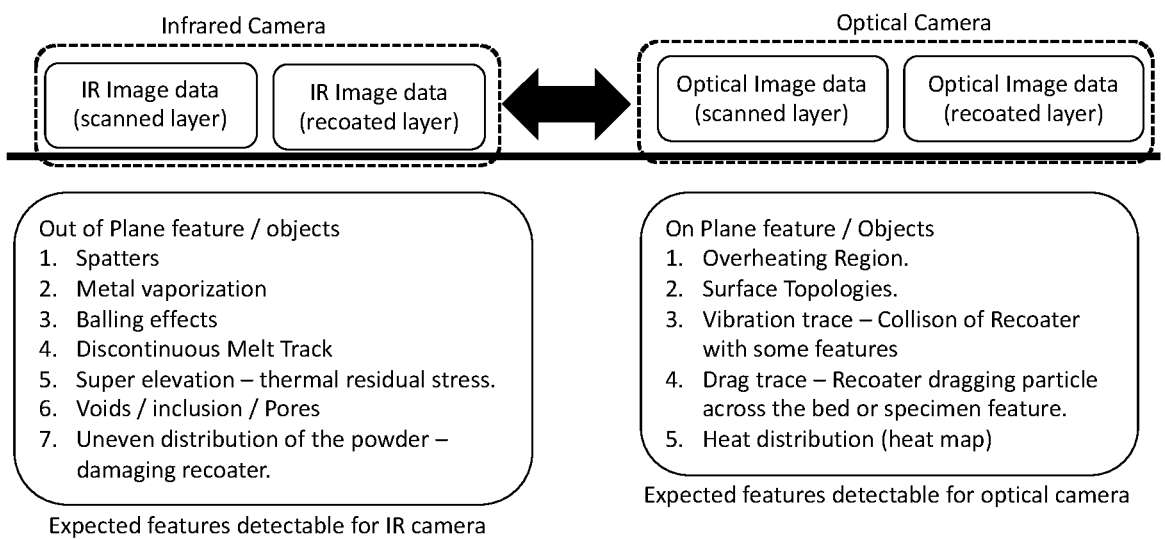
FIG. 2 shows tables of anomaly types, of which at least some, or all, are detectable by the system in accordance with various embodiments.

FIG. 2 shows an exemplary list of anomaly types and their association with the type of sensor data. The IR sensor may be configured to capture anomaly types that are in-plane of the building platform such as overheated region, heat distribution, vibration trace, drag trace and surface topologies. The optical sensor may be configured to capture anomalies that are out-of-plane and in-plane of the building platform. The present disclosure is not limited to above examples of anomaly types.

According to various embodiments the method may further include aligning an optical image and an IR image of the first perception data via corner detection of each of the optical image and the IR image, for example, prior to identifying anomalies of the workpiece. According to various embodiments the method may further include aligning an optical image and an IR image of the second perception data via corner detection of each of the optical image and the IR image prior to identifying anomalies of the workpiece. Examples of image alignment will be detailed further below, in connection with FIG. 12.

The optical image and the IR image of the perception data (e.g., first or second perception data) may be processed using image processing techniques, for example using a processor configured accordingly. In one example, the processing may be done with simulation tools, for example using Matlab (The MathWorks, Inc). According to various embodiments, image processing techniques may include enhancing pixels at least one of the foreground anomaly features and the background anomaly features. Enhancing pixels may include enhancing high value pixels and/or enhancing low value pixels. An example of high value pixels enhancement process is the LoPE process. An example of low value pixels enhancement is the HiPE process.

According to various embodiments of the system, the processor may be further configured to process the foreground anomaly features by a pixel enhancement of the foreground anomaly features. Alternatively or in addition, the processor may be configured to obtaining pixel difference between the foreground anomaly features and a reference perception data.

According to various embodiments of the system, the processor may be further configured to process the background anomaly features by a pixel enhancement of the background anomaly features. Alternatively or in addition, the processor may be configured to obtaining pixel difference between the background anomaly features and a reference perception data.

According to various embodiments of the system, the pixel enhancement of the at least one of the foreground anomaly features and the background anomaly features may be one of: high value pixels enhancement and low value pixels enhancement. An example of high value pixels enhancement process is the LoPE process. An example of low value pixels enhancement is the HiPE process.

Various embodiments relate to a method of in-situ identification of anomalies of a workpiece in a 3D printing manufacturing process. According to various embodiments, the system may be configured to carry out the method of in-situ identification of anomalies of a workpiece in a 3D printing manufacturing process. According to various embodiments, the method may further include segmenting the first perception data into foreground anomaly features and background anomaly features using the processor. The method may further include determining a type of anomaly based on at least one of the foreground anomaly features and the background anomaly features.

According to various embodiments, the method may further include processing the at least one of the foreground anomaly features and the background anomaly features prior to determining the type of anomaly. The processing may be, e.g., one of: enhancing pixels of the at least one of the foreground anomaly features and the background anomaly features; and obtaining pixel difference between the at least one of the foreground anomaly features and the background anomaly features and a reference perception data.

According to various embodiments, the method may further include obtaining a second perception data when the merged optical path is directed to the workpiece during a second stage of the 3D printing manufacturing process. The method may further include identifying anomalies of the workpiece based on the second perception data using the processor.

According to various embodiments the method may further include identifying the type of anomaly based on both the first perception data and the second perception data. According to various embodiments, the 3D printing manufacturing process may be a powder bed fusion process. The first stage of the 3D printing manufacturing process may be after a coated powder layer may be deposited and before a laser scanning fusion of the coated powder layer.

According to various embodiments the method may further include identifying two or more different types of anomalies of the workpiece from the optical image and the IR image. According to various embodiments the method may further include identifying two or more different types of anomalies of the workpiece from the optical image. According to various embodiments the method may further include identifying two or more different types of anomalies of the workpiece from the IR image.

According to various embodiments, the method may further include predicting quality of the workpiece using a deep learning model based on historical perception data stored in a memory.

More details of algorithms according to various embodiments will be explained below using the figures for illustration purposes.

Figure 3A:
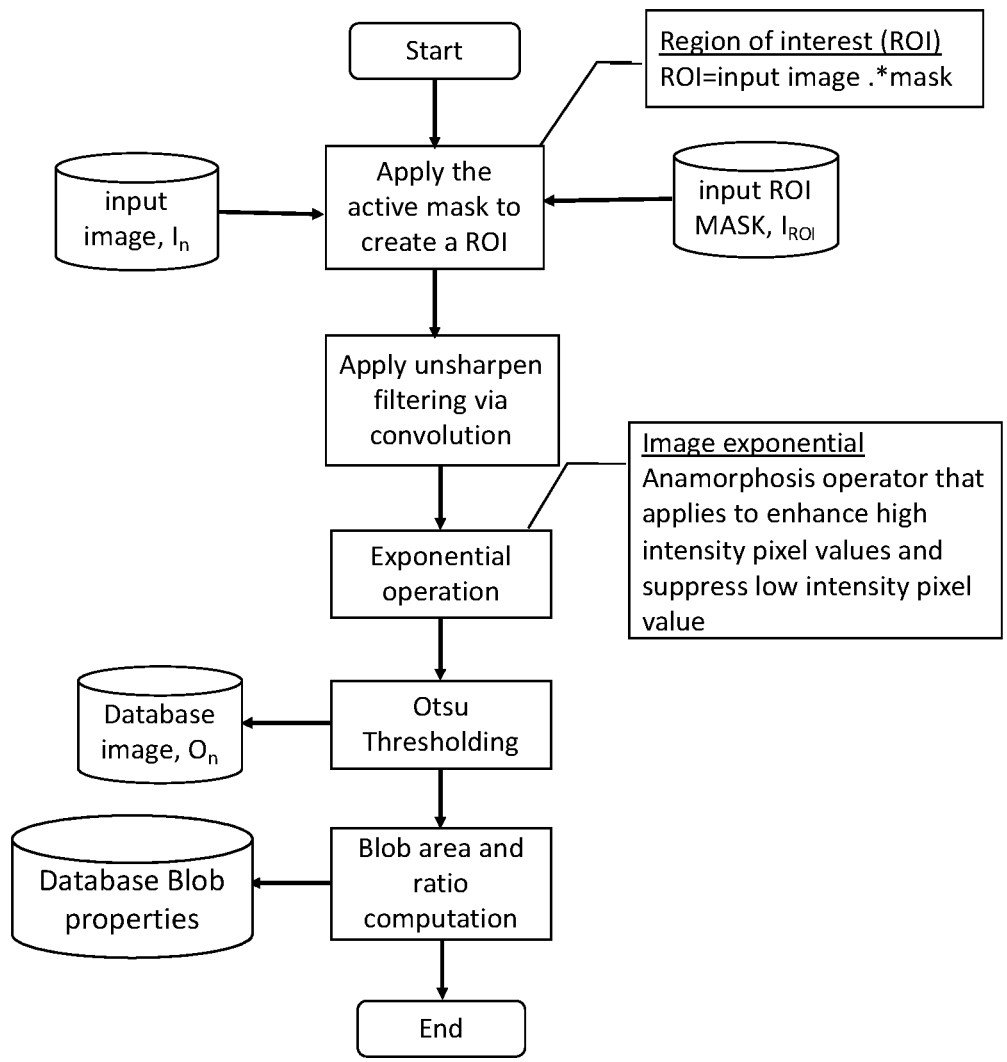
FIG. 3A shows an exemplary flowchart for determining high value pixels with the high pixel enhancement (HiPE) algorithm.

FIG. 3A shows an exemplary flowchart for determining high value pixels with the high pixel enhancement (HiPE) algorithm. In a first step, a region of interest (ROI) mask ($I_{ROI}$) is applied to the input image ($I_n$) to create an ROI image. The input image ($I_n$) may be the perception data's optical image and/or IR image. In a next, optional step, unsharpening filtering may be applied to the ROI image. In a next step, an anamorphosis operator, e.g. the exponential operator, may be applied to the ROI image (or unsharpened ROI image) to enhance high intensity pixel values and suppress low intensity pixel values. The image processed with the anamorphosis operator may be further processed with thresholding, for example Otsu thresholding, and the resulting image (On), including enhanced pixels, may be stored in a respective database. Blob area ratio may be computed based on the image resulting from thresholding ($O_n$), and the blob properties may be stored in a Blob properties' database. The HiPE algorithm may be used to enhance region with high pixel intensity while suppressing region with low pixel intensity.

Figure 3B:
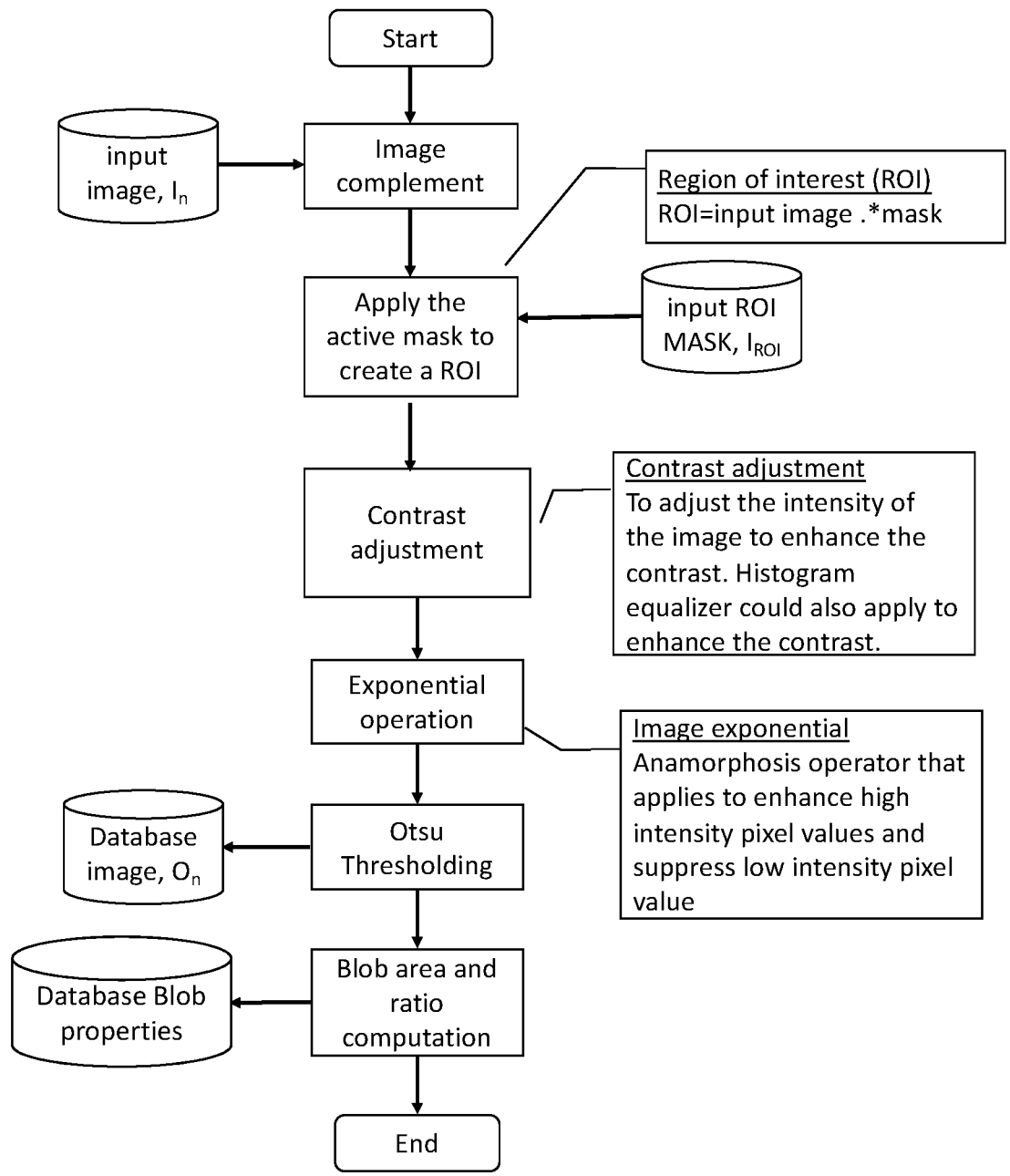
FIG. 3B shows an exemplary flowchart for determining low value pixels with the low pixel enhancement (LoPE) algorithm.

FIG. 3B shows an exemplary flowchart for determining high value pixels with the Low Pixel Enhancement (LoPE) algorithm. In a first step, an image complement of an input image ($I_n$) is generated. The input image (IL) may be the optical image or the IR image. In a further step, a region of interest (ROI) mask ($I_{ROI}$) is applied to the image complement to create an ROI image. In a next, optional step, contrast adjustment may be applied to the ROI image, for example contrast enhancement, or alternatively or in addition, a histogram equalizer could be applied to enhance the contrast. In a next step, an anamorphosis operator, e.g. the exponential operator, may be applied to the ROI image (or unsharpened ROI image) to enhance high intensity pixel values and suppress low intensity pixel values. The image processed with the anamorphosis operator may be further processed with thresholding, for example Otsu thresholding, and the resulting image ($O_n$), including enhanced pixels, may be stored in a respective database. Blob area ratio may be computed based on the image resulting from thresholding ($O_n$), and the blob properties may be stored in a Blob properties' database. The LoPE algorithm may be used to enhance low pixel value via image inversion to suppress high value pixel.

The HiPE and LoPE could be used for either after-scanned or after-recoated perception data of IR and/or optical sensor.

According to various embodiments of the system, the processor may be further configured to segment the first perception data into foreground anomaly features and background anomaly features. The foreground area of the images corresponds to the workpiece, for example fused layer area or to be fused layer area, in the case of a freshly coated powder layer. The background area corresponds to the powder bed area which does not belong to the workpiece, for example the non-fused or not to be fused area in the case of a freshly coated powder layer. The processor may be further configured to determine a type of anomaly based on at least one of the foreground anomaly features and the background anomaly features. Segmentation of the first perception data into foreground anomaly features and background anomaly features was found to reduce noise and improve the extraction of the feature of interest.

Figure 4:
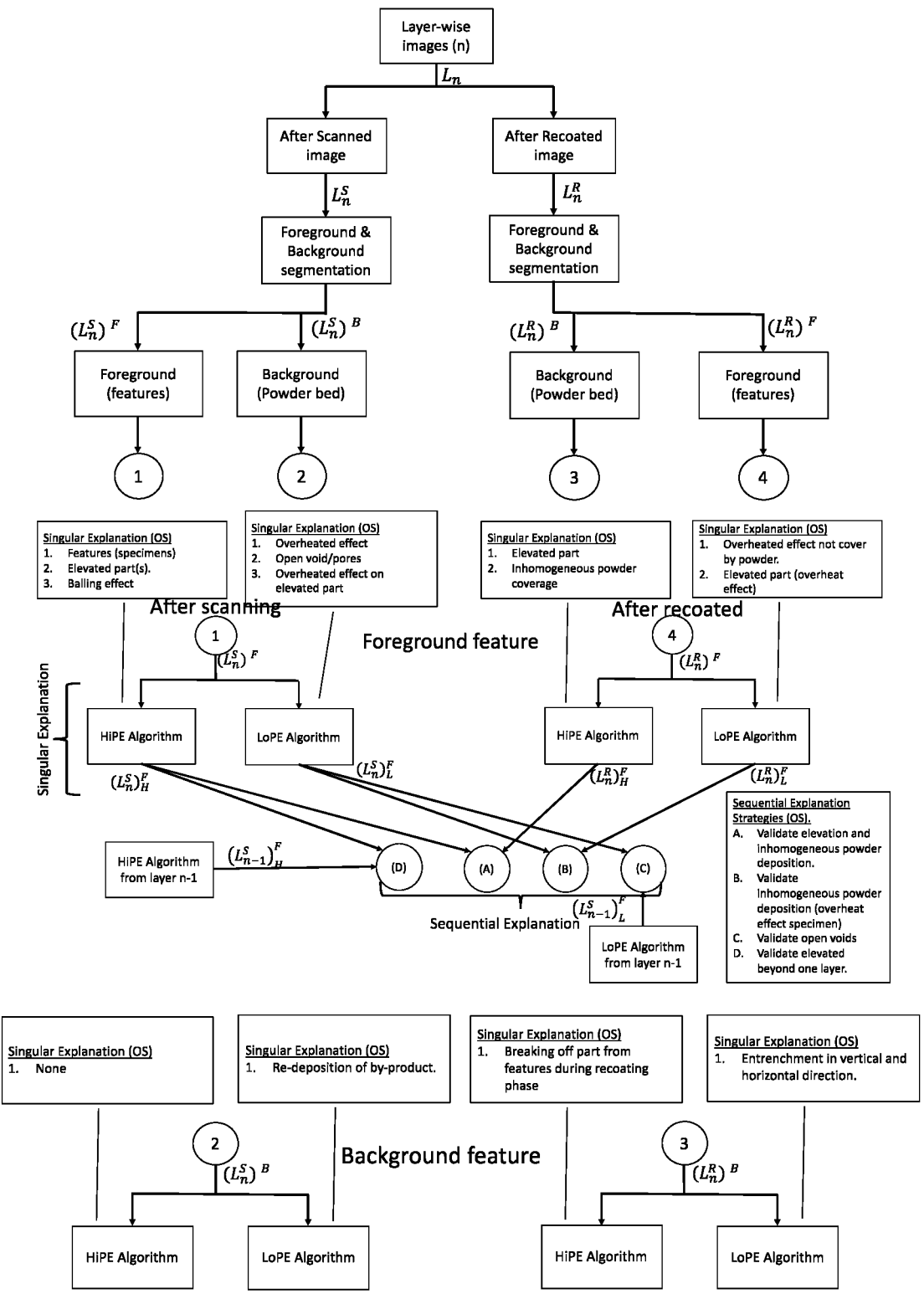
FIG. 4 shows an exemplary flowchart for sieving anomaly types.

FIG. 4 shows an exemplary flowchart for sieving anomalies, which can be used for optical images and/or IR images of perception data.

The top most box of FIG. 4 represents a data source including a layer-wise image (n) $L_n$. The layer-wise image may include a stack of images captured after the laser has scanned the regions, namely an after scanned image $L_n^S$, and after a new layer of powder has been overlaid on top of the scanned layer, namely an after recoated image $L_n^R$.

Shown in the flowchart of FIG. 4, following from the layer-wise image (n) $L_n$ from top down, are two branches, a first branch for the first perception data, for example an after scanned image $L_n^S$ (after laser scanning fusion), and second branch for an after recoated image $L_n^R$ (before a subsequent powder layer is deposited), however these images are used for illustration purposes and the disclosure is not limited thereto. At the first branch, the after scanned image $L_n^S$ may be processed to provide foreground $(L_n^S)^F$ and background $(L_n^S)^B$ segmented images, which may be further processed at flowchart connector 1 (①) and 2 (②) respectively. Similarly, at the second branch, the after recoated image $L_n^R$ may be processed to provide foreground $(L_n^R)^F$ and background $(L_n^R)^B$ segmented images, which may be further processed at flowchart connector 4 (④) and 3 (③) respectively.

Interpretation of the perception data may be carried out for a single layer (singular explanation) or for more than one layer (sequential explanation), for example, a sequence of layers. The background features may be further processed, for example to determine high value pixels and low value pixels, such as the HiPE and LoPE algorithm, as exemplified in the flowchart starting at flowchart connectors 2 and 3 (singular explanation).

Starting from flowchart connector 2, the background $(L_n^S)^B$ segmented image corresponding to the first perception data, may be processed to determine low value pixels, e.g. with the LoPE algorithm, the results of the processing may indicate the anomaly of re-deposition of by-product. A processing of the background $(L_n^S)^B$ segmented image corresponding to the first perception data to determine high value pixels may not be necessary.

Starting from flowchart connector 3, the background $(L_n^R)^B$ segmented image corresponding to the second perception data (e.g., including optical images and/or IR images), may be processed to determine high value pixels, e.g. with the HiPE algorithm, the results of the processing may indicate the anomaly of breaking off part from features during recoating. Alternatively or in addition, the background $(L_n^R)^B$ segmented image corresponding to the second perception data (e.g., including optical images and/or IR images), may be processed to determine low value pixels, e.g. with the LoPE algorithm, the results of the processing may indicate the anomaly of entrenchment in vertical and/or horizontal direction.

The foreground segmented images $(L_n^S)^F$ and $(L_n^R)^F$ may be processed with the singular explanation, for example, as explained below. Anomalies observed via Singular Explanation approach may be, e.g., one or more of: vertical trace, horizontal trace (vibration) and inhomogeneous powder distribution (insufficient powder coverage leads to the specimen in the previous layer to be exposed) in the recoated image.

Starting from flowchart connector 1, the foreground $(L_n^S)^F$ segmented image corresponding to the first perception data, may be processed to determine high value pixels, e.g. with the HiPE algorithm, the results of the processing may be a high value pixel single layer image $(L_n^S)^F_H$ which may indicate one or more of the anomaly types of workpiece (specimen), elevated part, balling effect. Alternatively or in addition, the foreground $(L_n^S)^F$ segmented image corresponding to the first perception data (e.g., including optical images and/or IR images), may be processed to determine low value pixels, e.g. with the LoPE algorithm, the results of the processing may be a low value pixel single layer image $(L_n^S)^F_L$ which may indicate one or more of the anomaly types of overheat effect, open void and/or pores, overheat effect on elevated part.

Starting from flowchart connector 4, the foreground $(L_n^R)^F$ segmented image corresponding to the second perception data, may be processed to determine high value pixels, e.g. with the HiPE algorithm, the results of the processing may be a high value pixel single layer image $(L_n^R)^F_H$ which may indicate one or more of the anomaly types of elevated part, inhomogeneous powder coverage. Alternatively or in addition, the foreground $(L_n^R)^F$ segmented image corresponding to the second perception data (e.g., including optical images and/or IR images), may be processed to determine low value pixels, e.g. with the LoPE algorithm, the results of the processing may be a low value pixel single layer image $(L_n^{SR})^F_L$ which may indicate one or more of the anomaly types of overheat effect not covered by powder, elevated part due to overheating.

Each of the high value pixel single layer images and low value pixel single layer images may, be used for sequential explanation, for example, as explained below.

The Sequential Explanation approach may include processing images (such as the high value pixel single layer images and/or low value pixel single layer image, obtained from the optical data and/or IR data) by at least one of: Coated—Coated Comparison (CCC) method, Coated—Scanned Comparison (CSC) method. These methods may be applied to the IR data and/or the optical data. For example, IR data and optical data may be used to validate the results of the method against each other.

For example, the high value pixel single layer image $(L_n^S)^F_H$ of the scanned layer and the high value pixel single layer image $(L_n^R)^F_H$ of the recoated layer may be used to validate elevation and inhomogeneous powder deposition, in step A (see connector A (Ⓐ)). The low value pixel single layer image $(L_n^S)^F_L$ and low value pixel single layer image $(L_n^R)^F_L$ may be used to validate inhomogeneous powder deposition due to overheating, in step B (see connector B (Ⓑ)).

According to various embodiments of the system, the processor may be further configured to obtain a second perception data when the merged optical path is directed to the workpiece during a second stage of the 3D printing manufacturing process. The processor may be further configured to identify anomalies of the workpiece based on the second perception data. For example, the second stage of the 3D printing manufacturing process may be any stage carried out after the first stage. According to various embodiments of the system, the 3D printing manufacturing process may be a powder bed fusion process. The first stage of the 3D printing manufacturing process may be after a coated powder layer is deposited and before a laser scanning fusion of the coated powder layer. According to various embodiments of the system the second stage may be after a laser scanning fusion of the coated powder layer and (i) before a next coated powder layer may be deposited, or (ii) after a next coated powder layer may be deposited and before a next laser scanning fusion of the next coated powder layer. Examples using first and second perception data are described in connection with see connector C (Ⓒ) and connector D (Ⓓ). Other examples using first and second perception data, for IR images, are described in connection with processing the IR images, for example in connection with FIG. 14.

The low value pixel single layer image $(L_n^S)^F_L$ and the low value pixel single layer image of a previous layer $(L_{n-1}^S)^F_L$ (both after scanning) may be used to validate open voids, in step C (see connector C (Ⓒ)). The high value pixel single layer image $(L_n^S)^F_H$ and the high value pixel single layer image of a previous layer $(L_{n-1}^S)^F_H$ (both after scanning) may be used to validate elevations beyond one layer, in step D (see connector D (Ⓓ)).

FIGS. 5A-5D illustrate the image outcomes using the algorithm in accordance with various embodiments, for example, as explained in connection with FIG. 4.

Figure 5A:
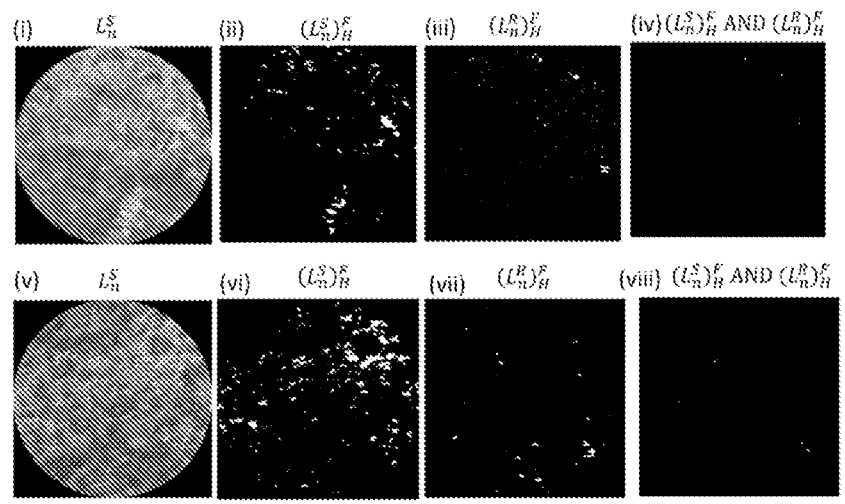
FIGS. 5A and 5B show exemplary images processed from different layers, in accordance with various embodiments.

The upper portion of FIG. 5A shows exemplary images processed from a layer n=9, including two optical images, the two optical images are a scanned image and a recoated image (recoated over the scanned image, not shown), in accordance with various embodiments. As used before, superscript F means the foreground features. In FIG. 5A, (i) shows an unprocessed optical image of a first scanned layer $(L_n^S,$ with n=9); (ii) shows the high value pixel single layer image $(L_n^S)^F_H$ of the scanned layer; (iii) shows the high value pixel single layer image $(L_n^R)^F_H$ of the recoated layer (an optical image of the recoated layer is not shown in FIG. 5A). Further, (iv) shows the result of a logical AND operation between the high value pixel single layer image $(L_n^S)^F_H$ and the high value pixel single layer image $(L_n^R)^F_H$ of the scanned layer, for example, in accordance with connector A (Ⓐ) in FIG. 4.

The lower portion of FIG. 5A shows exemplary images processed from a layer n=19, including two optical images, the two optical images are a scanned image and a recoated image (recoated over the scanned image, not shown), in accordance with various embodiments. As used before, superscript F means the foreground features. In FIG. 5A, (v) shows an unprocessed optical image of a first scanned layer $(L_n^S,$ with n=19); (vi) shows the high value pixel single layer image $(L_n^S)^F_H$ of the scanned layer; (vii) shows the high value pixel single layer image $(L_n^R)^F_H$ of the recoated layer (an optical image of the recoated layer is not shown in FIG. 5A). Further, (viii) shows the result of a logical AND operation of the high value pixel single layer image of the scanned layer $(L_n^S)^F_H$ with the high value pixel single layer image $(L_n^R)^F_H$ of the recoated layer, for example, in accordance with connector A (Ⓐ) in FIG. 4.

Observed bright blobs presence after the scanned layer may be of one or more of the following anomaly types: features of the workpiece, elevated part(s), scan track, balling effect with discontinuous scan track. As depicted in FIG. 5A (vi) and (viii), the blob areas suggest that there is a relation between the scanned layer and the coated layer. The blob areas are small which indicates that the presence of anomalies is insignificant. In these images, no part elevation, discontinue scan tracks, or balling effects are observed.

Figure 5B:
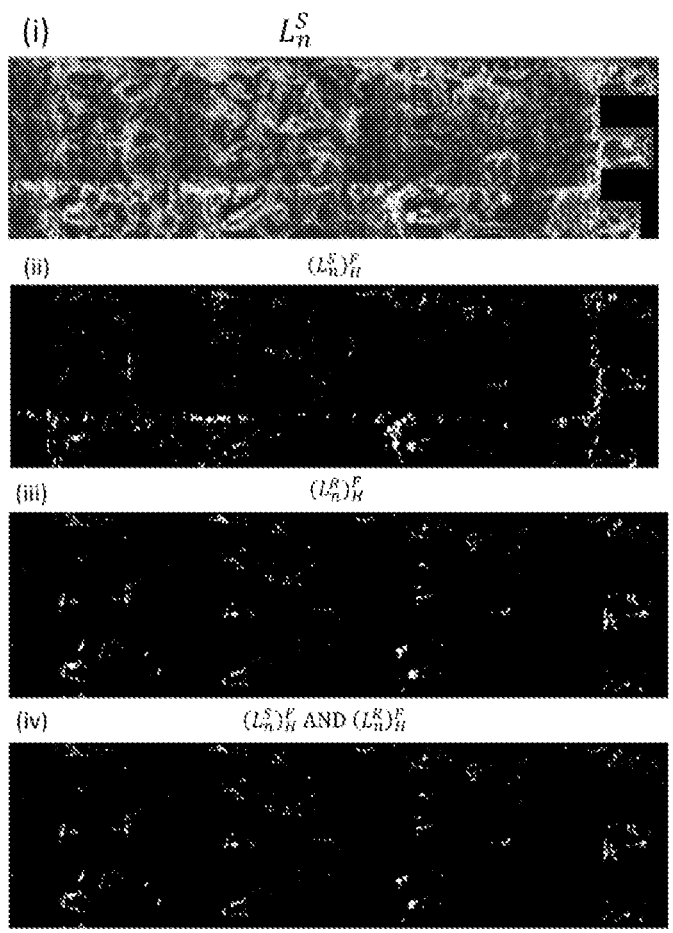

Analogously to FIG. 5A, FIG. 5B shows exemplary images processed from a layer n=184, including two optical images, the two optical images are a scanned image and a recoated image (recoated over the scanned image, not shown), in accordance with various embodiments. As used before, superscript F means the foreground features. In FIG. 5B, (i) shows an unprocessed optical image of a first scanned layer $(L_n^S,$ with n=184); (ii) shows the high value pixel single layer image $(L_n^S)^F_H$ of the scanned layer; (iii) shows the high value pixel single layer image $(L_n^R)^F_H$ of the recoated layer (an optical image of the recoated layer is not shown in FIG. 5A). Further, (iv) shows the result of a logical AND operation of the high value pixel single layer image of the scanned layer $(L_n^S)^F_H$ with the high value pixel single layer image $(L_n^R)^F_H$ of the recoated layer, for example, in accordance with connector A (Ⓐ) in FIG. 4.

Image (iv) obtained from the logical AND operation of the high value pixel single layer image $(L_n^S)^F_H$ with the high value pixel single layer image $(L_n^R)^F_H$ of the scanned layer, shows large blob areas. These large blob areas indicate a significant relationship between the scanned layer and the coated layer, which could be deduced as inhomogeneous powder distribution and part elevation. The presence of part elevation can be verified by the logical AND operation of $(L_n^R)^F_H$ image with the $(L_{n+1}^R)^F_H$ image.

Figure 5C:
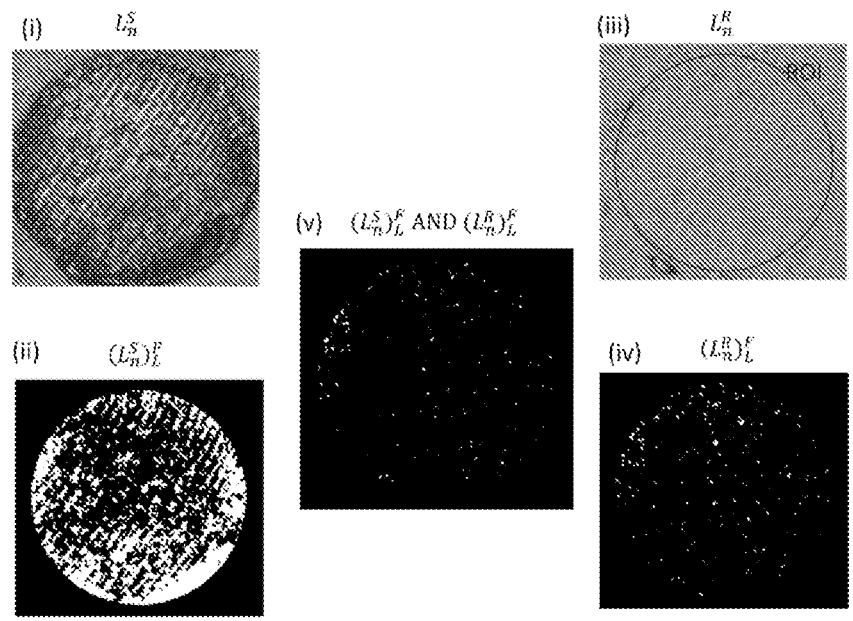
FIGS. 5C and 5D show exemplary images processed from different layers, in accordance with various embodiments, demonstrating anomalies created by of overheating.

FIG. 5C shows exemplary images processed from a layer n=9, including two optical images, the two optical images are a scanned image (i) and a recoated image (iii) (recoated over the scanned image), in accordance with various embodiments. As used before, superscript F means the foreground features. In FIG. 5C, unprocessed image (i) of a scanned layer $(L_n^S,$ with n=9) scanned with 350 W laser power and 367 mm/s scanning speed (for exemplary purposes). FIG. 5C (ii) shows the low value pixel single layer image $(L_n^S)^F_L$ of the scanned layer, for example, obtained by applying the LoPe algorithm on $L_n^S$; (iii) shows an image of the recoated layer $L_n^R$, which is a layer coated over scanned layer $L_n^S$; (iv) shows the low value pixel single layer image $(L_n^R)^F_L$ of the recoated layer, for example, obtained by applying the LoPe algorithm on $L_n^R$. Further, (v) shows the result of a logical AND operation of the low value pixel single layer image of the scanned layer $(L_n^S)^F_L$ with the low value pixel single layer image $(L_n^R)^F_L$ of the recoated layer, for example, in accordance with connector B (Ⓑ) in FIG. 4.

FIG. 5C shows an example of the observation of a dark blob after laser scanning to validate overheating phenomenon. Processing a scanned image to obtain the low value pixel single layer image $(L_n^S)^F_L$, for example by applying LoPe to $(L_n^S)^F_L$, emphasizes regions with low intensity. The result is depicted in FIG. 5C (ii) which contains large blob areas. The blob areas indicate overheated regions due to high laser energy density. Other possibilities could be uneven texture and inability to reflect the illumination back to the optical sensor. In the example of FIG. 5C (v), the logical AND operation produced scatting blob areas that are small which may be considered insignificant to be deduced as nonhomogeneous powder coverage or part elevation, thus further validating that the blobs in (ii) indicate overheated regions.

Figure 5D:
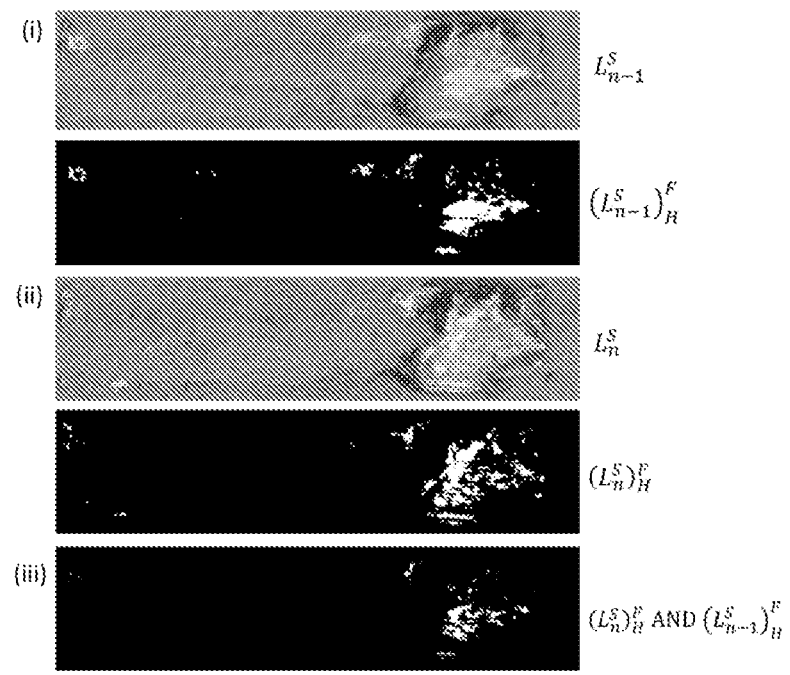

FIG. 5D shows exemplary images processed from layers n−1=198 and n=199, the two optical images are an image (i) from a scanned layer $L_{n-1}^S$, and a second image (ii) from a scanned layer $L_n^S$ (which was recoated and scanned over layer 198), in accordance with various embodiments. For illustration purposes, layers 198 and 199 are scanned with 175 W laser power and 550 mm/s scan speed. The $L_{n-1}^S$ and $L_n^S$ images are processed into $(L_{n-1}^S)^F_H$ and $(L_n^S)^F_H$ respectively, to determine high value pixels, e.g. with the HiPE algorithm. A logic AND operation of the image $(L_{n-1}^S)^F_H$ with the image $(L_n^S)^F_H$ is shown in FIG. 5D (iii). The result of FIG. 5D (iii) may be provided, for example, in accordance with connector D (Ⓓ) in FIG. 4.

FIG. 5D (iii) shows a bright blob after laser scan to validate part elevation. In the example of FIG. 5D, the HiPe algorithm is applied to images of scanned layers 198 and 199, to emphasize on high intensity regions. The digital images $(L_{n-1}^S)^F_H$ and $(L_n^S)^F_H$ show regions of large blob that indicates part elevation, as can be also observed in the optical image. The logical AND operation of these images produce significant blob areas indicating that the part elevation is significant.

Figure 6:
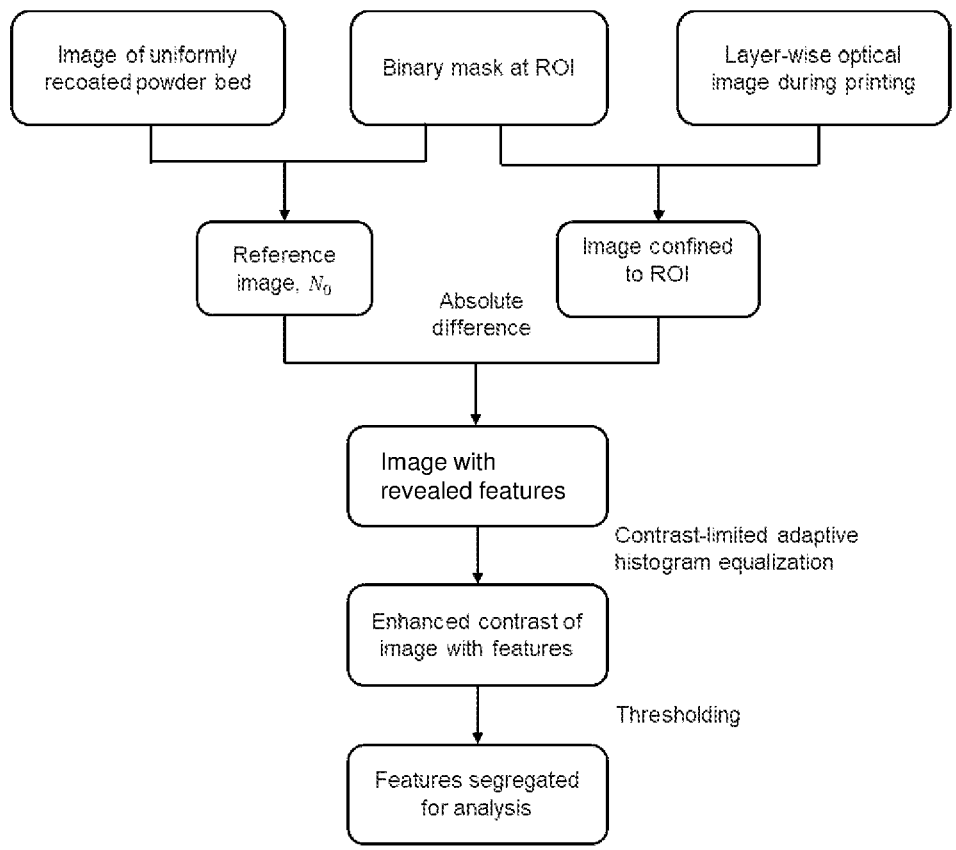

An exemplary algorithm for Features Extraction Based Absolute Difference (FEBAD) is shown in FIG. 6, in accordance with various embodiments. An image of the uniformly coated powder bed (uniformly coated layer) and layer wise optical image during printing (e.g. a layer after powder recoating after a scanned layer) may be provided. A mask may be provided, for example a binary mask indicating the ROI (e.g., ROI as "1" and non-ROI as "0"), which mask may be used for keeping the ROI (foreground features) of the uniformly recoated powder bed image and layer wise optical image while deleting (e.g., zeroing) the background features. A reference image $N_0$ may be provided by masking the uniformly recoated powder bed image with the mask. The reference image $]N_0$ is, in this example, the reference perception data. An image of a scanned layer confined to ROI may be provided by masking the layer wise optical image with the mask. The image of the scanned layer confined to ROI is, in this example, the perception data, also named as current perception data. For example, the mask may include ROI pixels as "1" and non-ROI pixels as "0", and masking may be a logical AND operation or a multiplication.

An absolute difference may be provided between the image of a scanned layer confined to ROI and the reference image No, thereby providing an image with revealed features. The absolute difference between the reference perception data and current perception data results in the presence of features represented by pixels that are of higher grayscale intensity values (brighter) than the background.

The image with revealed features may be processed for contrast enhancement, thereby providing a contrast enhanced image having features with enhanced contrast. For example, a contrast-limited adaptive histogram equalization may be applied to the image to enhance the contrast between the features and the background. The features may be extracted from the contrast enhanced image, for example by considering the thresholding using the maximum entropy method, where, for example, black pixels (logical "0") represent extracted features and white pixels (logical "1") represent the background. These black pixels (logical "0") representing features may be labelled and quantified to evaluate the size and location of features for each recoated layer.

Figure 7:
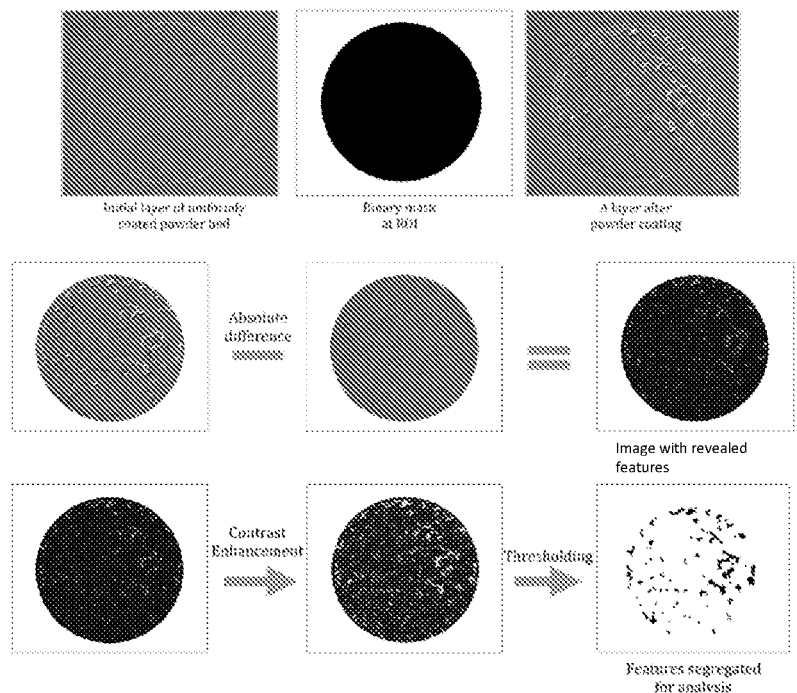
FIG. 7 shows an illustration of images processed with the algorithm of the flowchart of FIG. 6A.

FIG. 7 illustrates the image outcome using the algorithm as specified in FIG. 6. An image of the uniformly coated powder bed, for example of an initial layer of uniformly coated powder bed, may be provided and masked with a binary mask at ROI. A layer wise optical image during printing, for example, of a layer after powder recoating after a scanned layer, may be provided and masked with the binary mask at ROI. The binary mask may be logical OR operated with the two images, so that image pixels corresponding to black masking pixels (logical "0") remain unchanged and image pixels corresponding to white masking pixels (logical "1") are all set to "1", which, in this example is represented with white. After masking, an absolute difference between the image of a scanned layer confined to ROI and the reference image No may be calculated which results in the image with revealed features.

As strategies as mentioned, 3 image processing algorithms are proposed, however the present disclosure is not limited thereto and variants or other processing algorithms may be used. The herein presented processing algorithms include (1) High Pixel Enhancement (HiPE), (2) Low Pixel Enhancement (LoPE) and (3) Features Extraction Based Absolute Difference (FEBAD). The HiPE and LoPE may be considered the baseline algorithms and could be used for either after-scanned or after-recoated perception data of the optical sensor.

Figure 8:
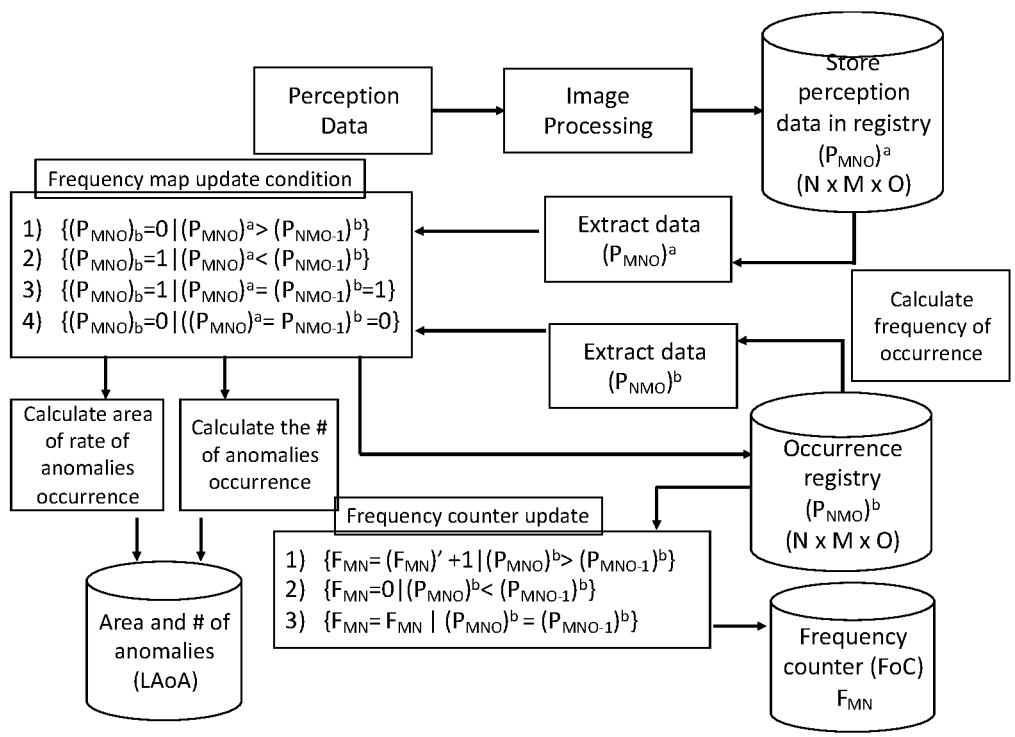
FIG. 8 shows an exemplary flowchart of an algorithm to determine frequency, area, and number of anomalies, in accordance with various embodiments.

The algorithms aforementioned may be applied in in-situ monitoring, which requires process time that is less than and is depending on scanning time of each layer. The perception data of the entire build artefact may be validated against mechanical properties test and CT scanned image data. FIG. 8 depicts an exemplary method for perception data processing to determine one or more of (1) an area of the rate of change of the anomalies per layer, (2) a number of areas of the rate of change of the anomalies per layer; and (3) the accumulative of anomalies for the entire build. These data may be validated with the CT scanned data to find their correlation. Furthermore, a correlation between the rate of change of anomalies and the mechanical properties (e.g., Ultimate Tensile Strength, Yield Strength, % of elongation, and/or density) may also be determined.

Figure 9:
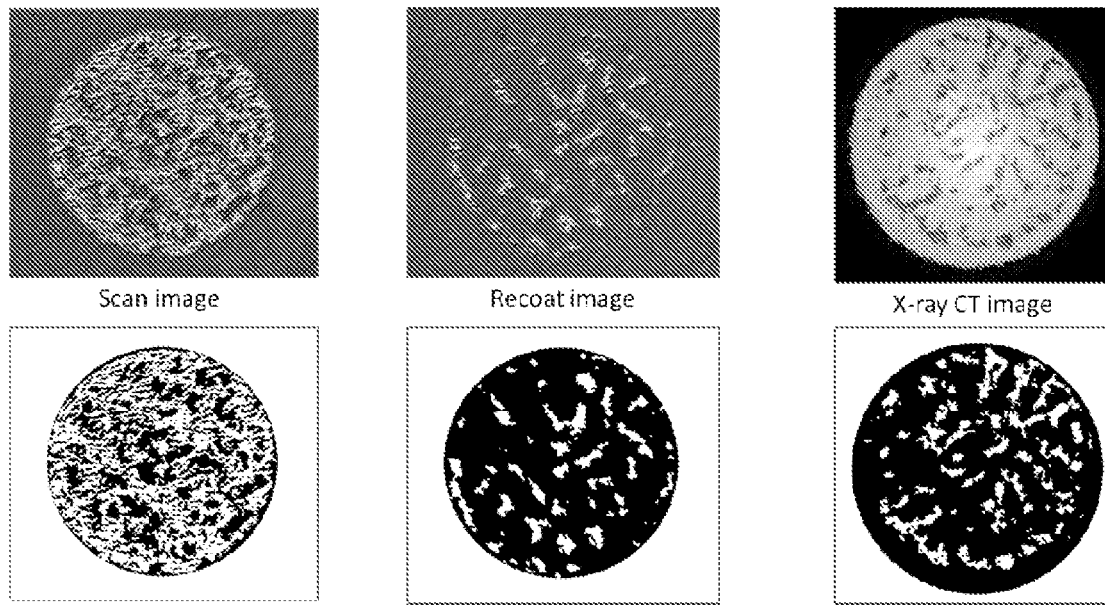
FIG. 9 shows exemplary scan and recoat images in comparison with an X-ray CT image.

FIG. 9 shows a comparison of features extracted by image analysis of optical data and of CT scan data. The recoated and scanned images may be processed by the FEBAD algorithm, the extracted features for recoated image represent elevation. The extracted features for scanned image represent printed areas. The CT scan data from the CT scans may be processed by using the modified Feldkamp algorithm for cone-beam acquisition geometry, for example using a microtomography software, such as in SkyScan NRecon software (Bruker Corporation). The CT scan image may be processed by applying a threshold to convert to binary image by SkyScan NRecon software (Bruker Corporation). The features of CT scan image represent porosity of printed part. FIG. 9 shows, on the left, an image of a scanned layer (top) and its corresponding extracted features' image (bottom). In the middle, FIG. 9 shows an image of a recoated layer (top) and the corresponding extracted features' image (bottom). On the right, FIG. 9 shows the corresponding x-ray CT-image of the same layer (from the final product) on top, and the image with extracted features from the corresponding x-ray CT-image on bottom.

Figure 10:
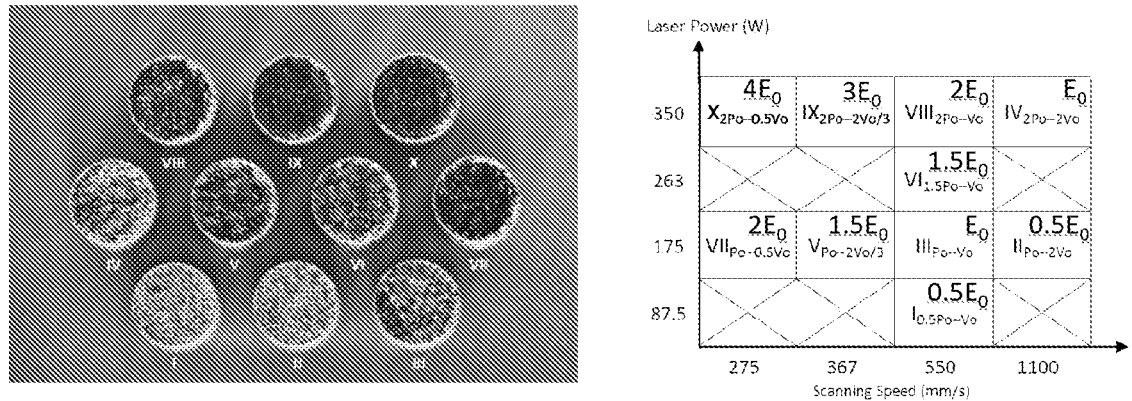
FIG. 10 shows the results of printing different energy densities.

FIG. 10 shows, on the left side, reference samples wherein each sample is printed with a different energy density (E) by varying the scanning speed (v), and varying the laser power (P). In this example, scanning speeds were used of 275 mm/s, 367 mm/s, 550 mm/s ($v_0$), and 1100 mm/s. In this example, laser powers were used of 87.5 W, 175 W ($P_0$), 263 W, and 350 W. The reference samples are marked with roman numerals which correspond to the numerals in the table at the right side. The table shows several combinations between laser power and scanning speed leading and their relation to energy density (from $0.5E_0$ to $4E_0$, wherein $E_0$ is the energy density at $v_0$ and $P_0$).

Figure 11A:
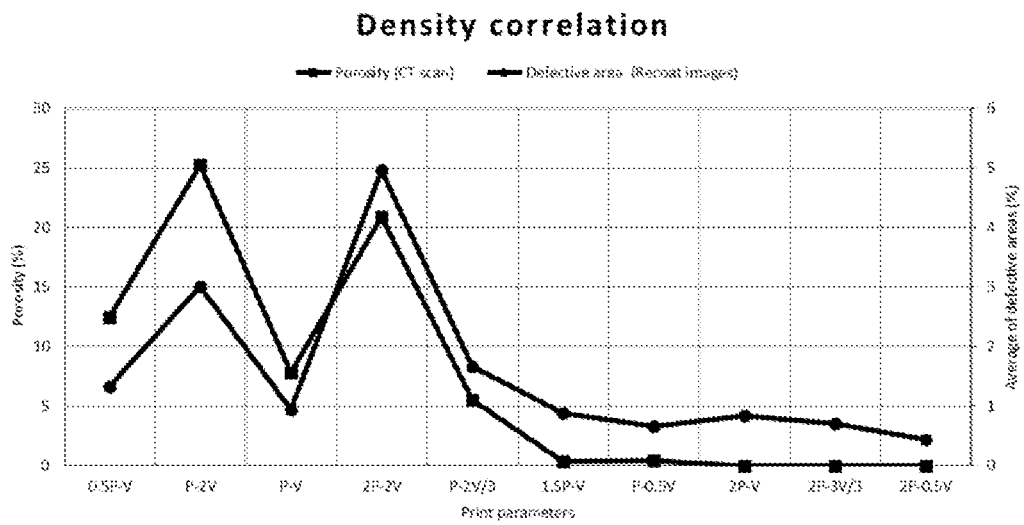
FIGS. 11A-11C shows the correlation between mechanical properties and the average percentage of defective pixels obtained by image processing of examples in accordance with various embodiments.
Figure 11B:
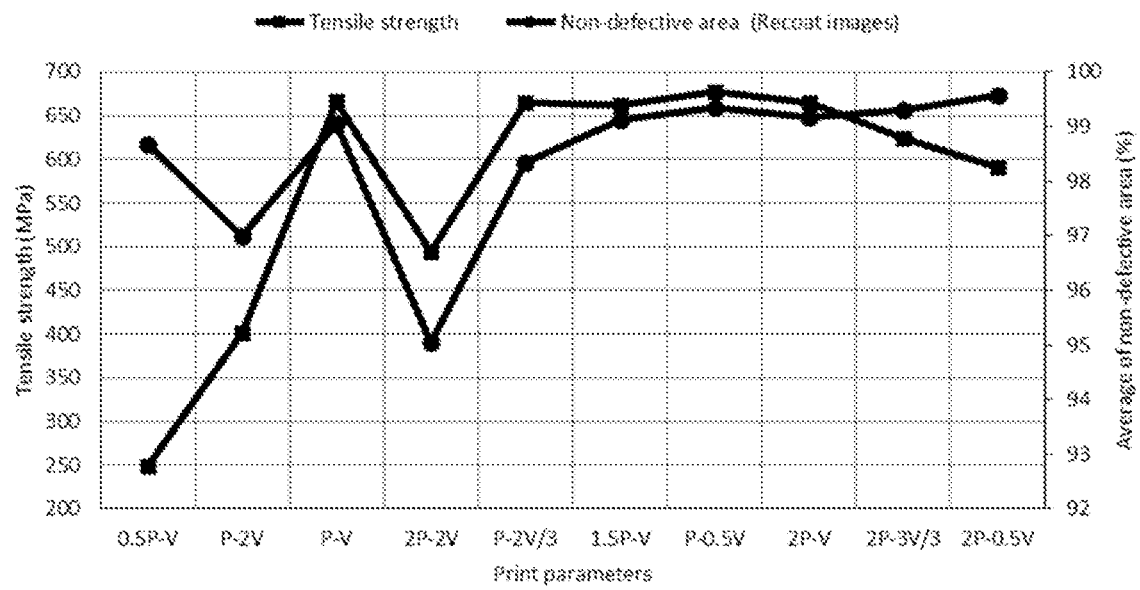
Figure 11C:
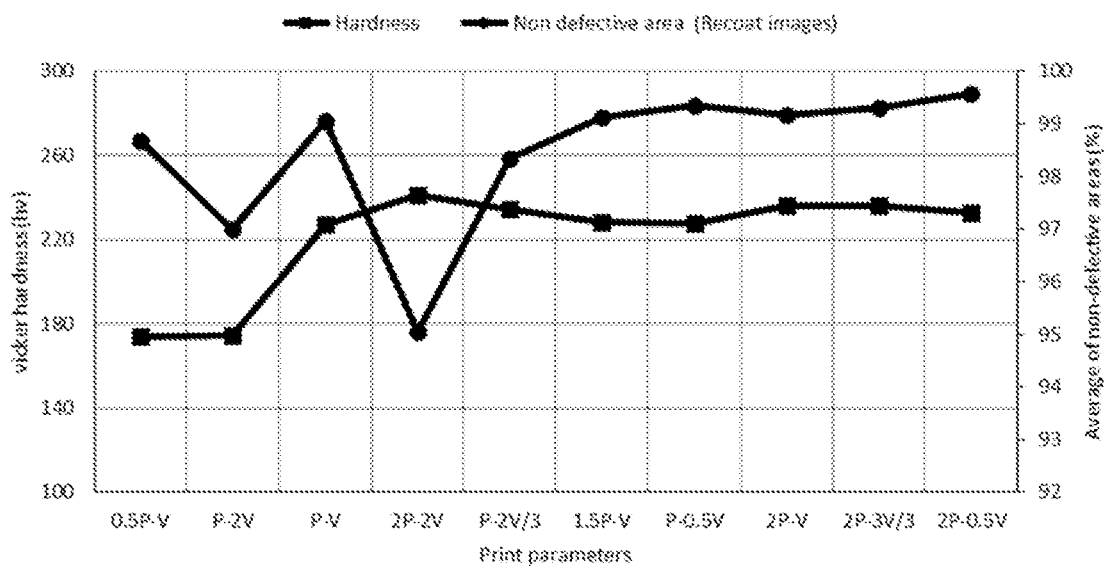

FIGS. 11A-11C, illustrate the correlation between the mechanical properties and the average percentage of defective pixels by image processing (which are processed by the FEBAD algorithm) for various printing parameters as shown in FIG. 10. Both hardness and tensile strength are dependent on micro defects. Since the density is less related on thermal history, residue stress level and material properties as bulk material than the mechanical strength, the tensile correlation is slightly better than the hardness correlation.

Data correlation may be done by considering the number of anomalies and the area of each anomaly for the optical layer and CT cross-section images, at regular spacing, for example, at every 50 micrometer. In the Examples of FIGS. 11A-11C, data correlation was done by considering the number of features and the area of each feature for optical and CT images at every 50 micrometer. The aim was to determine the maximum correlation between the two series. The cross-correlation function measures the similarity between a time series and lagged versions of another time series as a function of the lag. The data series are correlated based on Pearsons's correlation.

In the following, image registration between optical image and IR image will be explained.

According to various embodiments, the first perception data and/or the second perception data may include an optical image and an IR image. For example, each of the first perception data and the second perception data includes an optical image and an IR image. The processor may be further configured to align the optical image and the IR image via corner detection of each of the optical image and the IR image prior to identify anomalies of the workpiece and/or to provide calibration data.

Figure 12:
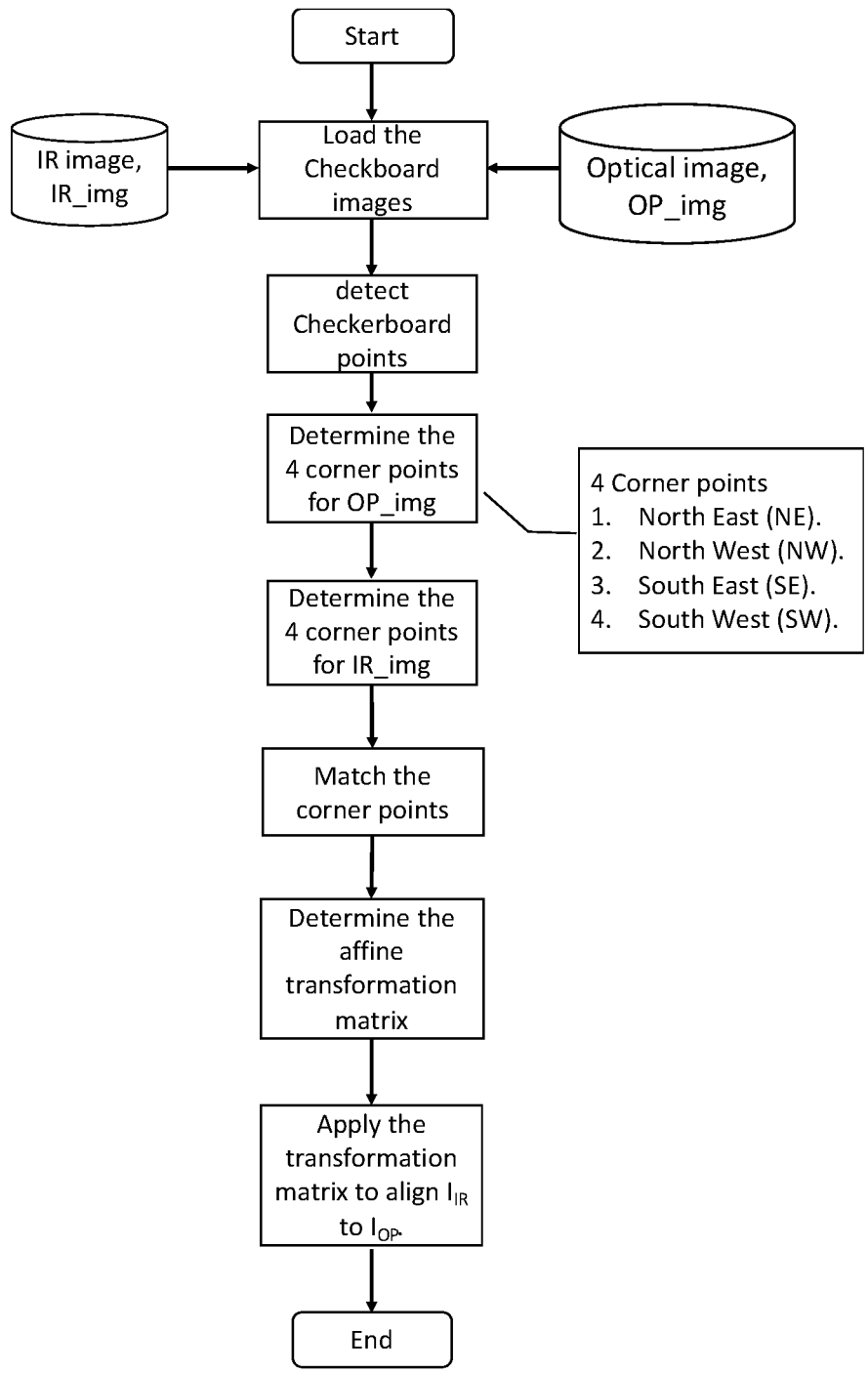
FIG. 12 shows an exemplary algorithm for registration of two images, in accordance with various embodiments.
Figure 13:
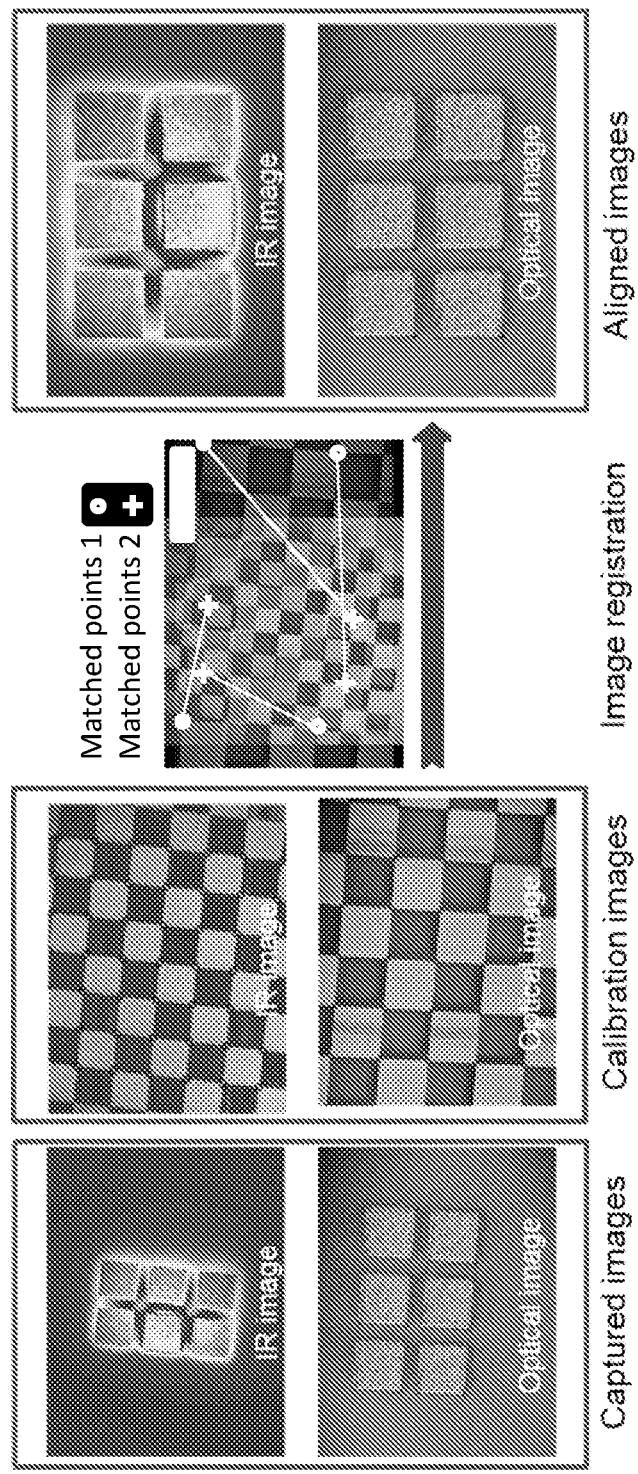
FIG. 13 show exemplary steps applied for image registration on two images.

An exemplary algorithm for image registration is shown in FIG. 12 which is further illustrated with the images of FIG. 13. FIG. 12 and FIG. 13 use calibration images, for example in the form of checkerboard, for determining an affine transformation matrix. According to various embodiments, image registration may be conducted, prior to any image processing algorithm, to align an IR image, to a corresponding optical image, such that both images correspond to the same physical structure. Image registration may also be conducted to a plurality of IR images ($I_{IR}$) and a plurality of corresponding optical images ($I_{OP}$). This may be implemented to ensure that the data from each image was referred to the same physical structure. For example, the affine transformation matrix may then be used to align optical and IR images during printing manufacturing process of the workpiece.

The affine transformation matrix may be determined with the calibration images by aligning the optical and IR images. This alignment may be done by determining the affine transformation matrix of the IR image ($I_{IR}$) to optical images ($I_{OP}$), or vice-versa. As depicted in FIG. 13, corner detection may be used to detect the corner of the feature in Iop and $I_{msk}$. From the set of possible checkerboard points, the location of the extreme point may be determined using simple logical rules, such as follows:

$$\{C(I_{x1},I_{y1})=C_{SE}(I_{x1},I_{y1})|I_{x1}<I_{x2} \text{ and } I_{y1}>I_{y2}\}$$

$$\{C(I_{x1},I_{y1})=C_{NE}(I_{x1},I_{y1})|I_{x1}>I_{x2} \text{ and } I_{y1}<I_{y2}\}$$

$$\{C(I_{x1},I_{y1})=C_{SW}(I_{x1},I_{y1})|I_{x1}>I_{x2} \text{ and } I_{y1}>I_{y2}\}$$

$$\{C(I_{x1},I_{y1})=C_{NW}(I_{x1},I_{y1})|I_{x1}<I_{x2} \text{ and } I_{y1}<I_{y2}\}$$

Once the extreme point is identified, the remaining corner points are determined by counting the number of pre-determined checkerboard points in the x and y direction. The pre-determined checkerboard points must be the same as the number of checkerboard points determined on the optical image. The next step is to identify the matching points for each pair of corner points for both the optical and IR image. The IR image is perpendicular to the optical image due to the experiment setting, an algorithm is included to match the points. The matching points are as follow: $C_{NW}^{OP}=C_{SW}^{IR}$, $C_{NE}^{OP}=C_{NW}^{IR}$, $C_{SW}^{OP}=C_{SE}^{IR}$ and $C_{SE}=C_{NE}^{IR}$. The subscripts refer to cardinal directions wherein, the top of the figure is north and the right is east. The superscript or subscript "OP" means optical image and the superscript "IR" means IR image. Ix # and Iy #(# refers to a point index 1, 2, 3, . . . ) are the coordinates to specify a point in the check board. For example, ($I_{x1}$, $I_{y1}$) is the $1^{st}$ point detected and ($I_{x2}$, $I_{y2}$) is the $2^{nd}$ point detected on the checker board. By knowing the gradient, it is possible to know the angle of the image rotated in plan view. Using this simple concept, the rotation misalignment of the optical and IR images may be found for image registration. The affine transformation matrix may be determined by using matlab function 'fitgeotrans'. The affine transformation matrix may be applied to align the $I_{IR}$ to $I_{OP}$, for illustration purposes, but may also be used to align the Iop to the $I_{IR}$. Once the alignment is done, both $I_{OP}$ and $I_{IR}$ would have the same scale. This would allow for validation of the observed anomalies for overheating phenomenon.

At the start of the process of FIG. 12, the calibration images (e.g. checkboard images) are loaded from the respective memory locations, for example the respective data bases IR_img for the IR image and OP_img for the Optical image. Examples of the calibration images can be seen in FIG. 13. After loading the calibration images the process detects checkerboard points (as described above), determines the corner points (e.g. 4 corner points) of the optical image, and determines the corner points (e.g. 4 corner points) of the IR image. The corner points are illustrated in the calibration image and the optical image in FIG. 13, for illustration purposes. In a next step the corner points from the optical image are matched with the corner points of the IR image (see image registration in FIG. 13), and the affine transformation matrix is determined. An example of the usage of the affine transformation matrix is shown in FIG. 13, wherein the affine transformation matrix determined using the calibration images is used to align the captured IR image and Optical image and to obtain the aligned images. While a process for image registration is disclosed in connection with FIGS. 12 and 13, the disclosure is not limited thereto, and other algorithms may be used.

Figure 14:
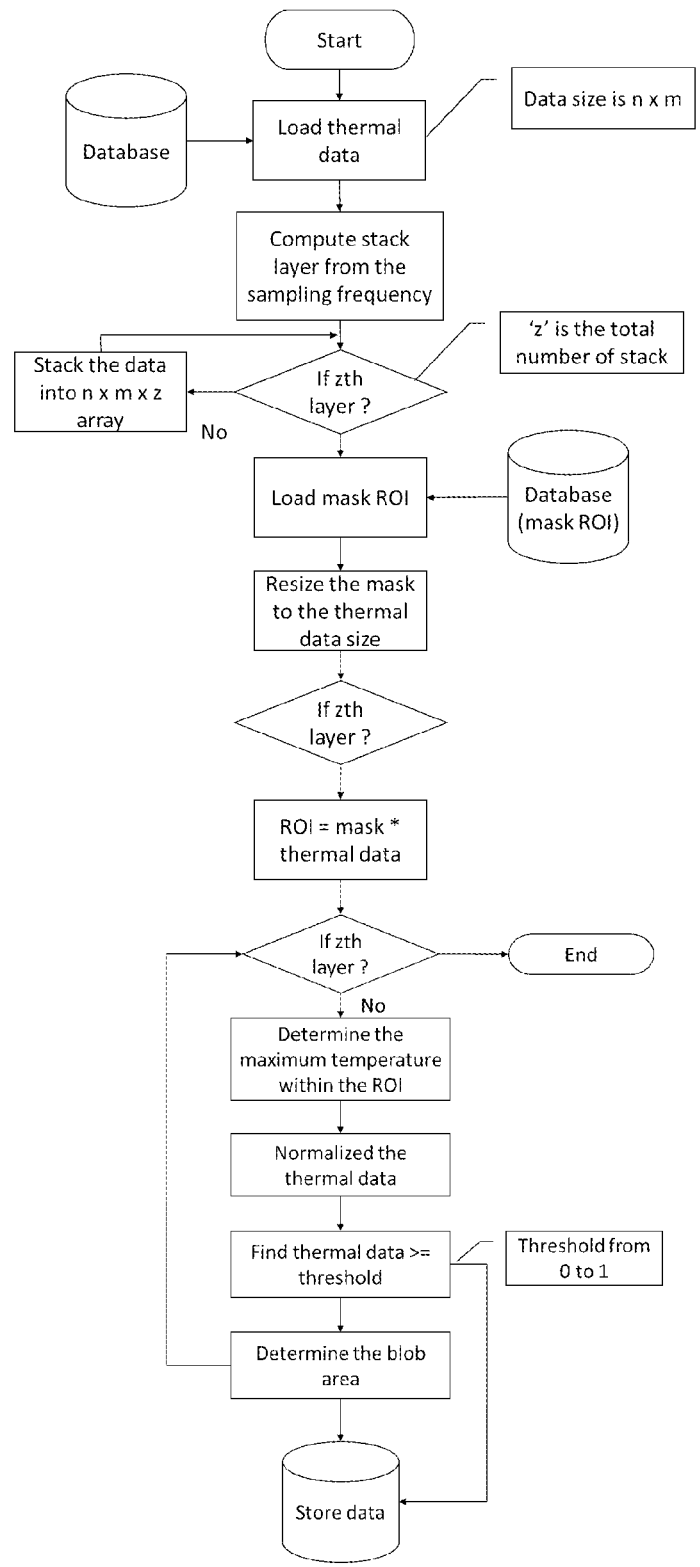
FIG. 14 shows an exemplary flowchart of an algorithm for determining thermal data.

FIG. 14 shows how the thermal data may be processed, for example, for identifying overheated areas. For example, thermal data may be obtained during the laser scanning at a certain frame rate, which may be higher than the layer scanning rate.

The perception data (from optical and IR sensors) employing the aforementioned algorithms may be validated against the perception data from the CT scans and mechanical tests. For example, the IR sensor may be configured to capture the thermal images, e.g., in the range of 2-25 frames per second which may be manually defined. Differently from IR images, the thermal images represent temperature, for example, in relative or absolute values. Thermal images may be determined based on IR images. The higher the frame rate, the better the accuracy however, the size of the data will be larger. The thermal images are loaded, e.g., in a memory, and processed by a microprocessor, to compute the stack layer from the sampling frequency. This process may be repeated until a plurality, for example all, thermal images corresponding to the scan layers are calculated. The thermal images may include collated thermography data, for example, as a 2D thermal map. The thermal images may be stacked in a 3 dimensional array, exemplified with dimensions m×n×z before further processing.

In a further step, a region of interest (ROI) mask ($I_{ROI}$) may be applied to each of the thermal images to create an ROI image. The ROI mask may be resized before it is applied to the thermal images, if necessary.

A normalization operation may be carried out for each of the thermal images. A threshold operation may be carried out for each of the thermal images, thereby determining regions of lower/higher cooling rate. The threshold operation may be a binary threshold. After thresholding, the blob area may be determined for each layer and the data may be stored. For example, a template may be created, e.g. manually, to obtain the region of interest (ROI) for examining. Once the ROI is created, a temperature range of a predetermined percentage, e.g. −10%, from the highest temperature detected within the ROI may be used as threshold to compute the cooling rate. To determine the temperature, the max temperature of the ROI is found and only temperatures within −10% from the max, e. g., $T_{max}*90\%<T<T_{max}$, are considered. T is used to determine the temperature of the feature. The thermal data may be used for comprehending the data from the optical images for better understanding of the anomalies. For example, an overheated part would have dark region in the optical image that could be misunderstood as incomplete melting due to excessive powder deposited, while it may be clarified by processing the IR images that the dark region is actually an overheated region.

Figure 15A:
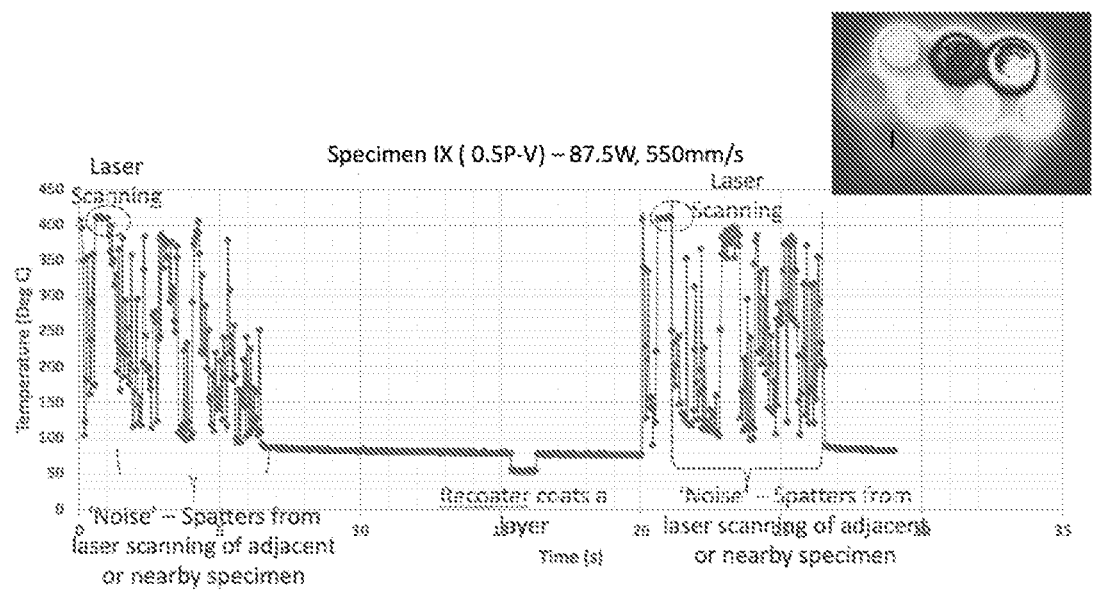
FIGS. 15A and B show examples of temporal thermal effects in powder bed fusion.
Figure 15B:
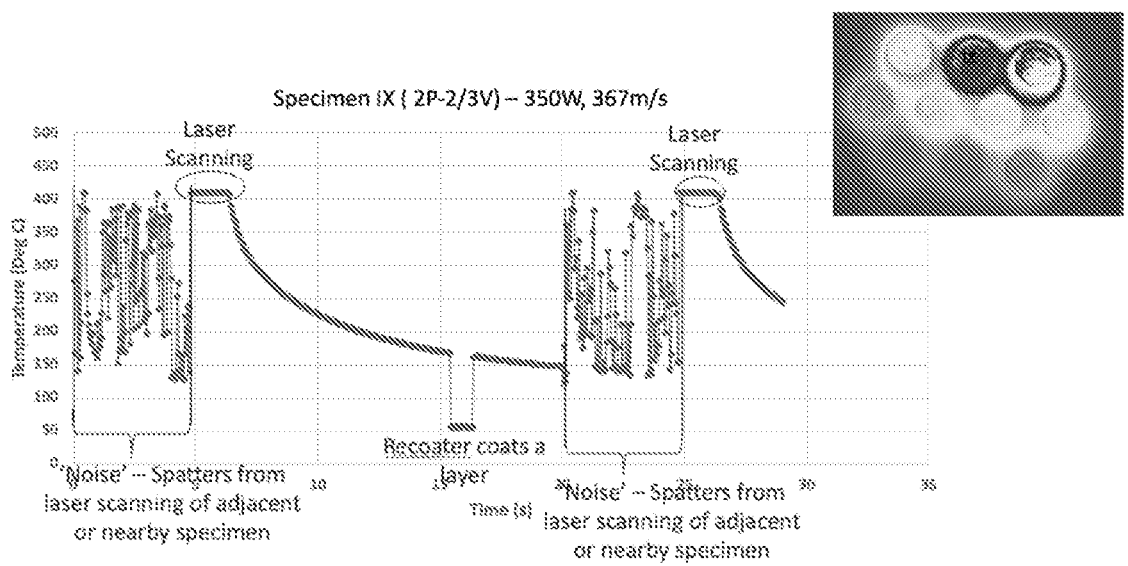
Figure 16:
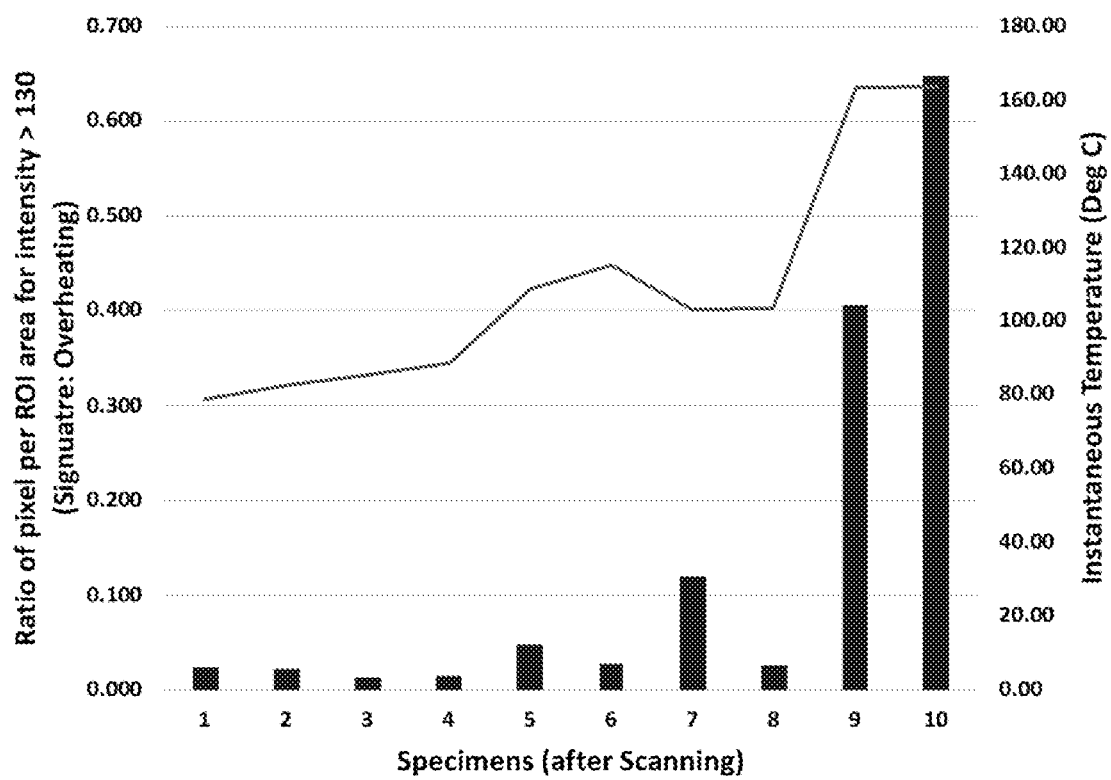
FIG. 16 shows compares the blob area ratio to temperature in examples in accordance with various embodiments.

In examples, from the results obtained from building specimens with different laser energy density as depicted in FIG. 10. FIG. 15(a) depicts the temporal max thermal effect for a specimen 1. The laser scanning is identified with a temperature range of 410° C.-411° C. that last for 0.5 seconds. This is followed by the phenomenon identified as noise where spatters from laser scanning of adjacent or nearby specimen are detected by the IR sensor. There is a drop in the temperature till the next layer is scanned. According to various embodiments, on the temporal max thermal effect chart, an "entrenchment" may be found. This entrenchment may be identified as the moving of recoated to deposit a new layer on top of the powder bed. Hence the temperature beginning of the "entrenchment" could be used to correlate to the optical image for "after laser scanning" and end of "entrenchment" could be used to correlate to the optical image for "after recoated". FIG. 15 (b) shows the temporal max thermal effect for specimen 9 with high laser energy density. FIG. 16 depicts the correlation between the blob area ratio and recorded temperature.

Various embodiments may also relate to a classification method and a system configured to carry out the classification method. The classification method may receive the perception data and produce classifications, e.g. as a multiclass classification system, which classes indicate the presence and/or level of anomalies. A deep learning model may be used for the classification. The classes obtained as output of a deep learning model, for example in a multiclass output of a convolutional neural network, may correspond to one or more of the anomaly types.

According to various embodiments of the system, the processor may be configured to identify two or more different types of anomalies of the workpiece from the optical image and the IR image. According to various embodiments of the system, the processor may be configured to identify two or more different types of anomalies of the workpiece from the optical image. According to various embodiments of the system, the processor may be configured to identify two or more different types of anomalies of the workpiece from the IR image.

According to various embodiments of the system, the processor may be configured to employ a deep learning model to predict quality of the workpiece based on the historical perception data. For example, the deep learning may include a convolutional neural network configured including fully connected layers to classify the perception data into one or more of the anomaly types: overheating region, metal vaporization, balling effect, discontinuities (e.g., discontinuous melt track), elevation, thermal residual stress, voids, inclusion, pores, heat distribution, non-uniform powder deposition, drag trace. According to various embodiments, the processor may be configured to classify the perception data into multiple classes, for example being selected from the anomaly types: overheating region, metal vaporization, balling effect, discontinuities (e.g., discontinuous melt track), elevation, thermal residual stress, voids, inclusion, pores, heat distribution, non-uniform powder deposition, drag trace. According to various embodiments, the processor may be configured to provide a bounding box, e.g., as image coordinates, for each of the classes that indicates that an anomaly is detected.

For example, the prediction of printing quality may be provided using deep learning on the database of acquired images (perception data), for example using Convolutional Neural Networks (CNN). Convolutional Neural Networks (CNN) may be employed to predict the quality of a new print job based on the database of images captured after laser scanning. In examples, CNN was found to be able to classify images with extraordinary accuracy. It is able to automatically detect important features without any human supervision. CNN uses special convolution and pooling operations followed by several fully connected layers. The convolution in conjunction with pooling layers will perform feature extraction based on the optical and thermal data captured by this proposed in-situ monitoring system. The convolution layers learn such complex characteristics by building small features on top of each other. For instance, the first layers detect edges, the next layers combine them to detect shapes and the following layers merge this information to deduce that there is a defective feature. Subsequently, a couple of fully connected layers act as a classifier wrapping up the extracted features and assigning a probability for the characteristics of the input images.

Figure 17:
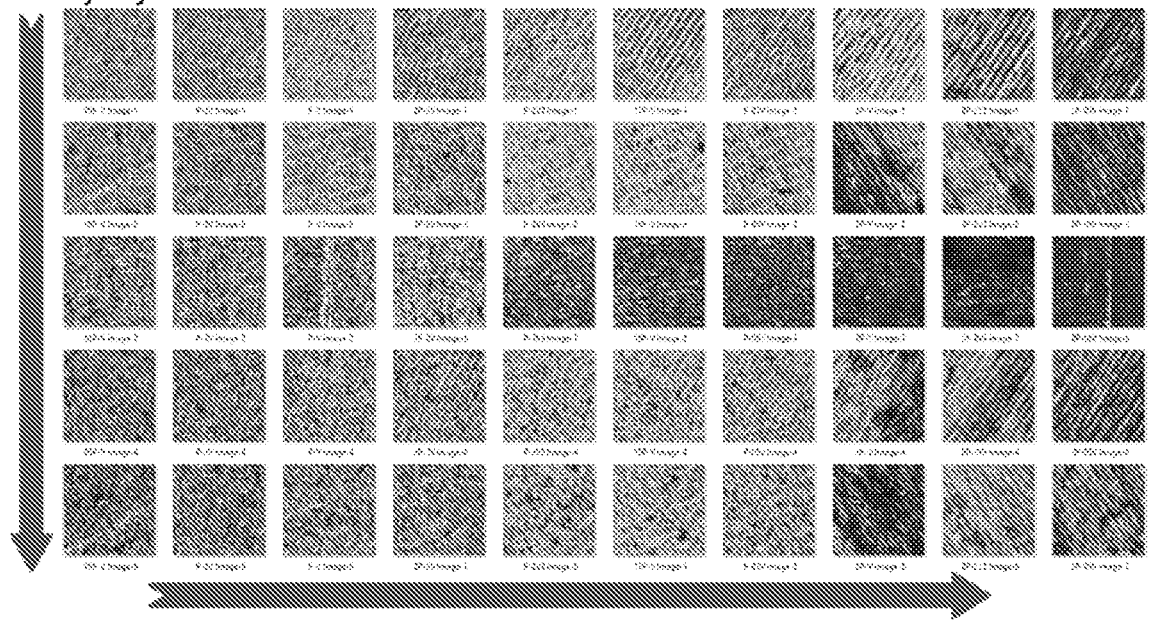
FIG. 17 shows exemplary extracted images used as training samples.

FIG. 17 shows the extracted features of every layer of the whole print job with varying printing parameters for inputting into the deep learning model, these extracted features may be used as training data. The columns represent variation of process parameters (laser power and scanning speed). Each row represents data captured for each layer of the whole print job. We can observe that the surface morphology of the low energy input samples is characterized by discontinuous melting tracks while samples with higher energy input have smoother surface texture. Further increasing energy input could cause overheating which results in darken areas on the surface.

Figures 18A, 18B:
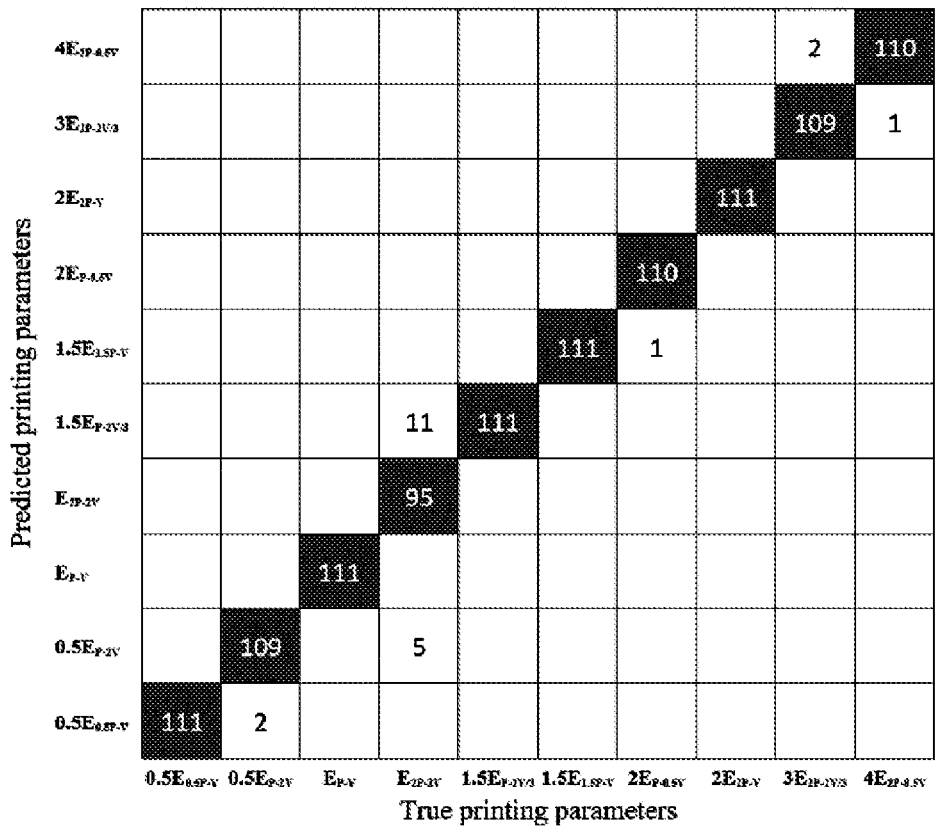
FIGS. 18A and 18B show an example of a confusion matrix and respective parameters used to evaluate the performance of a trained model, in accordance with various embodiments.

FIG. 18A shows an example of a confusion matrix to evaluate the performance of a trained model, in accordance with various embodiments. The printing parameters used and the energy factors are shown in the table of FIG. 18B. The P represents laser power wherein 1P=175 W, and the V represents scanning speed, wherein 1V=550 mms$^{-1}$. The energy density is defined as E=P/(V×h×t), wherein h is the hatch spacing, and t is the layer thickness. The energy density E is directly proportional with laser power P and inversely proportional with scanning speed V. In the experiments, the hatch spacing h and layer thickness t are constant with the values of 140 micrometer and 50 micrometer, respectively.

Figure 19:
FIG. 19 shows exemplary optical images and IR imaging recording during a printing process.

The confusion matrix of FIG. 18A demonstrates the performance of the trained deep learning model on new images. The images are extracted from raw scanned images by cropping the 10 areas corresponding to 10 printed samples. The total sample input used for producing FIG. 18 is 1110 images with 111 images for each parameter (10 parameters in total). The accuracy of prediction can reach 98% which demonstrates that we can use the database of captured images to predict a quality of a new print job, for example whether the energy input is insufficient or too high. The 98% corresponds to 1088 correct prediction out of 1110 input images. The confusion matrix is created with the optical data for illustration purposes. The deep learning model may include both optical and IR data, for example obtained after image registration process. The herein described systems and methods provide a holistic analysis of anomaly detection and capability of real-time anomaly detection and classification. FIG. 19 shows exemplary optical images and IR imaging recording during a printing process. As can be seen, the laser scans the upper portion of the workpiece (see corresponding bright spot in the optical recording) and the IR image shows the temperature of the workpiece, showing that the upper portion is hotter and the heat has some distribution which goes beyond the workpiece and into the background area (non-workpiece region). The image acquisition of the scanning process may be carried out after the powder deposition process (recoated layer) and during the scanning process. Sequences of image during the laser scanning may be captured in a video format, for example with the frequency of 30 frames per second. These image sequences can be saved in video format such as Audio Video Interleave (AVI) or MPEG-4 (MP4).

Figure 20:
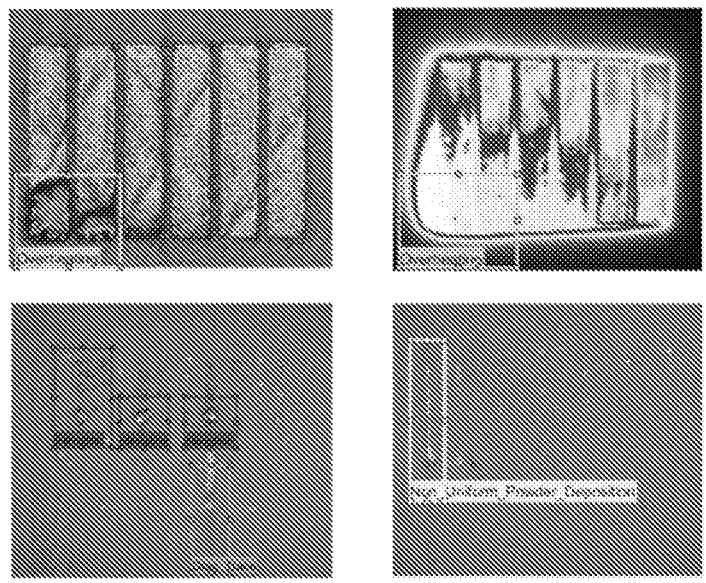
FIG. 20 shows optical images on the left and the corresponding IR images on the right, including overlays indicating the type of anomaly detected in accordance with various embodiments.

FIG. 20 shows optical images on the left and the corresponding IR images on the right. The images on the top are taken after scanning, and the images on the bottom are images after recoating (on the scanned layer shown on top). The images include boundary boxes overlaid to the images indicating the type and location of anomalies detected in accordance with various embodiments. Overheating was identified in both the optical and the IR images of the scanned layer and the overheated region is marked by a boundary box. In the optical image of the recoated layer, 3 elevations are identified and marked, and one drag trace. Furthermore, on the bottom right of the same image is shown an optical image where a non-uniform powder deposition is identified and marked.

Figure 21:
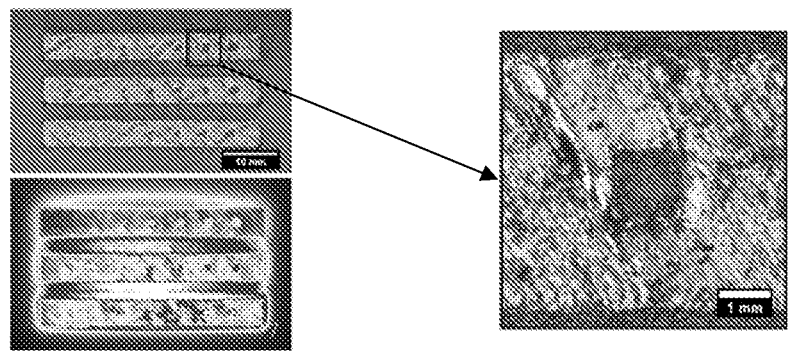
FIG. 21 shows a first perception data including an optical image and further including corresponding IR image of a workpiece. A zoomed area of the optical image is shown on the right side.

FIG. 21 shows a first perception data including an optical image and further including corresponding IR image of a workpiece. A zoomed area of the optical image is shown on the right side. FIG. 21 illustrates the capability of the monitoring system which is able to resolve small features like melting tracks with a resolution of 10 to 13 micrometer/pixel.

Figure 22:
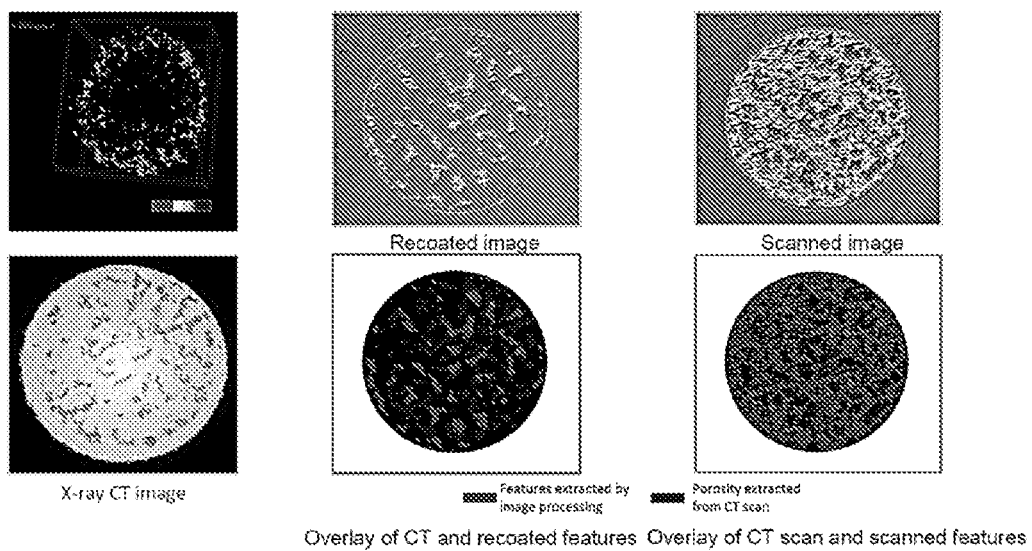
FIG. 22 shows the correlation of image analysis in accordance with various embodiments with CT data, it can be seen that porosity is more likely to occur at adjacent areas of elevated features.

FIG. 22 shows the correlation between the features extracted from perception data (see FIG. 9) in accordance with various embodiments, with the x-ray CT images. As can be seen form the overlap of the features extracted from the perception data with the features extracted from the x-ray CT images, porosity, which are regions of lower density, is more likely to occur at adjacent areas of elevated features. Refer also to the plot of FIG. 11A showing the density correlation.

Figure 23:
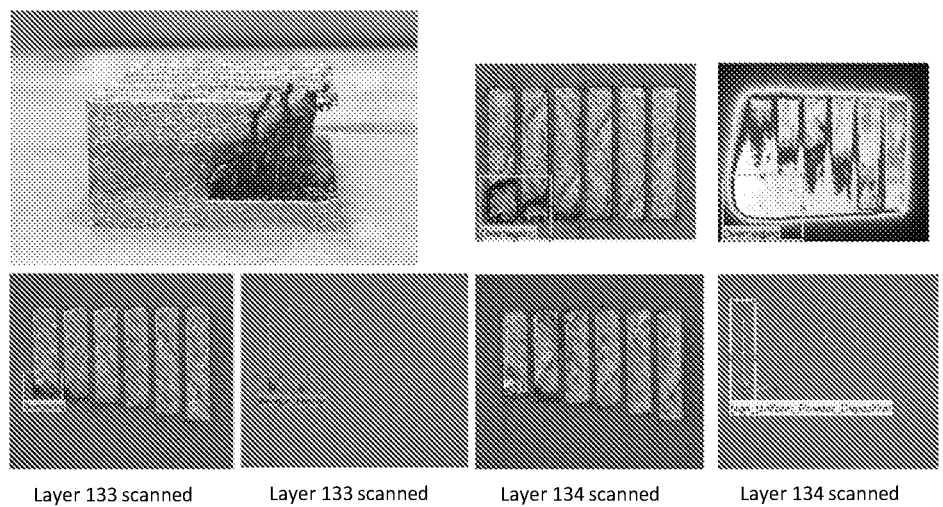
FIG. 23 shows various images, including overlays indicating the type of anomaly detected in accordance with various embodiments.
Figure 24:
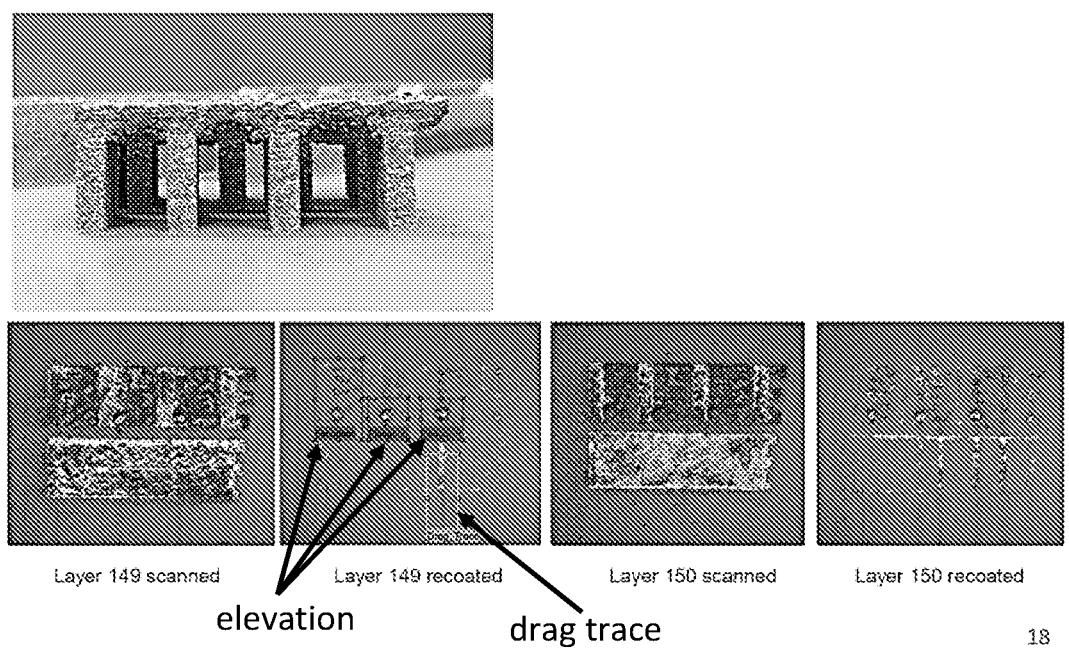
FIG. 24 shows various images, including overlays indicating the type of anomaly detected in accordance with various embodiments; low thermal conductivity of metal powders below unsupported edges caused local overheating and elevation of built part which in turn damaged the recoater blade.

FIG. 23 and FIG. 24 show features extracted indicating anomalies for consecutive layers. In FIG. 24 it is shown how low thermal conductivity of metal powders below unsupported edges causes local overheating and elevation of the workpiece layer which in turn may damage the recoater blade, which can be indicated by drag traces.

According to various embodiments, the DED process involves the continuous deposition of powder material or wire at the print head and direct fusion of material to form a solid part on the build platform. The energy source in the DED process could be either a laser or an electron beam. It is focused below the print head to melt and fuse material on the build platform layer by layer in which the desired two-dimensional sections of the three-dimensional object is formed by the relative movement between the print head and the build platform.

The present disclosure exploits the combination of sensor fusion methodology using an optical sensor and an IR sensor to provide a multi-control approach for in-situ observation of a range of anomaly types using the perception data. The anomaly types, are previously described, and exemplary types are: lack of fusion, surface unevenness (from optical data), residue stress, cracks (from thermal data). According to various embodiments, the use of an accelerometer and gyroscope sensors to identify the relative movement between print head and the build platform may be used for reconstruction of the printing path and identification of defect location within the workpiece geometry.

The proposed invention employs IR sensor and optical sensor to acquire perception data of the printing activities, for example, but not limited to: material deposition, material fusing, solidification and cooling of fused areas, for quality evaluation. The schematic of the proposed design is depicted in FIG. 25.

Figure 25:
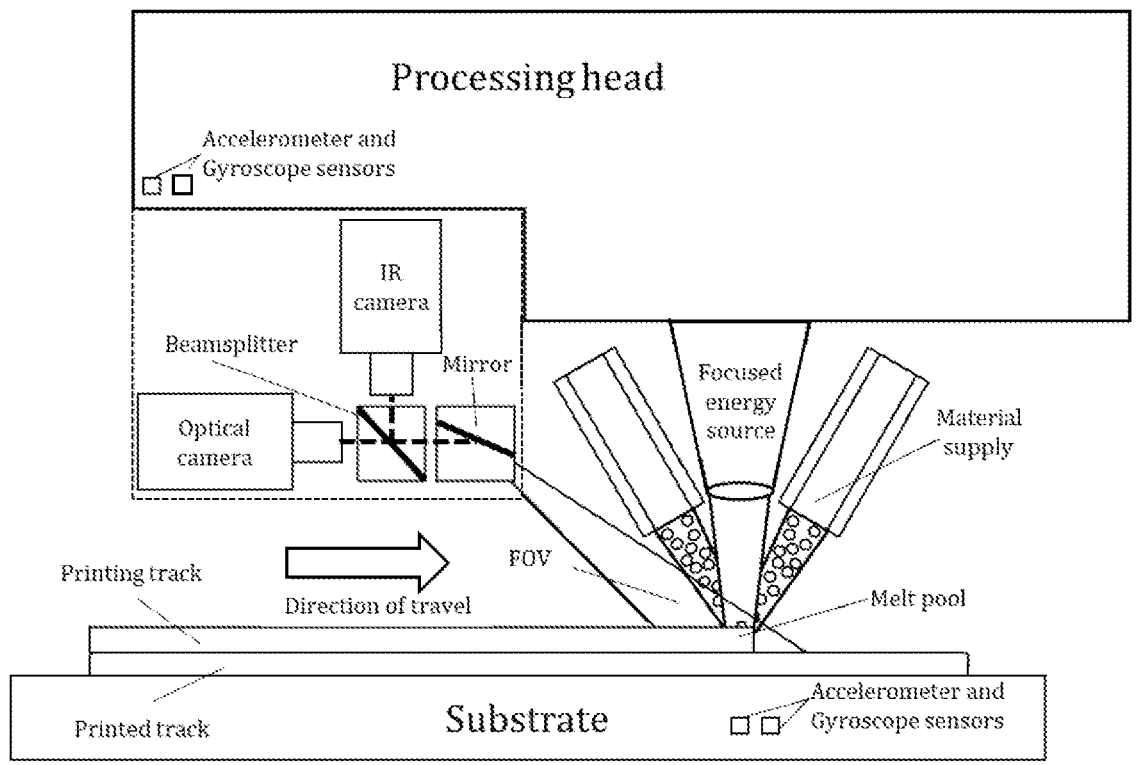
FIG. 25 shows another exemplary schematic representation of a 3D printing equipment including a system in accordance with various embodiments.

FIG. 25 shows another exemplary schematic representation of a 3D printing equipment including a system in accordance with various embodiments. FIG. 25 shows a processing head including optics for focusing energy beam onto a printing track over a substrate. In proximity to the optics for focusing the energy beam, a dispenser, e.g., a nozzle, may be arranged for providing material supply to be fused by the focused energy beam. In the example, two nozzles are shown, but one nozzle or more than two nozzles may also be provided. In some embodiments, the nozzles are oriented such that the material intersects the focused energy beam at the track over the substrate. When the energy beam interacts with the material it creates a melt pot, fusing the material to itself and to any below track which is already on the substrate, thereby providing the printing track. One or both of the substrate and the printing head may be mobile, each may include a corresponding accelerometer sensor and/or may include a corresponding gyroscope sensor. In the example illustrated in FIG. 25, a first track "printed track" is shown printed on the substrate and a second track "printing track" is shown being printed in a direction of travel, from left to right.

The monitoring system, in accordance with various embodiments, is shown installed on the processing head, by way of example. By having a fixed position in relation to the melt pot, the field of view (FOV), once adjusted to overlap with the meltpot, may always follow the point of the workpiece being fused. As shown, the monitoring system includes an optical sensor (e.g. an optical camera) having an optical path and an infrared sensor (e.g. an IR camera) having an IR path. The monitoring system may further include an optical device (e.g. a beamsplitter) configured to merge the optical path and the IR path to obtain a merged optical path. The merged optical path arranged to be directed, e.g., via a mirror, to the workpiece (e.g. to the position wherein the focused energy source fuses the material to create the workpiece). The infrared sensor and/or the optical sensor may record perception data during different stages of the 3D printing manufacturing process, for example a first perception data at a first stage (e.g. during formation of the "printed track"), and a second perception data at a second stage after the first stage which may be in different layers (e.g., during formation of the "printing track").

FIG. 25 shows by way of example, that the localize region may be constrained by the field of view (FOV) of the deflectors set up such as beam splitter and mirror. Accelerometer and gyroscope sensors may be attached to the print head and the build platform to identify their relative movement for reconstruction of printing path and identification of anomaly locations within part geometry.

FIG. 25 shows by way of example, that the monitoring system may be attached and moved together with the processing head. The optical path (OP) of the IR and optical sensor are merged via a dichroic beamsplitter. According to various embodiments, the dichroic beamsplitter is able to reflect IR wavelength (short to mid wavelength) and transmit visible wavelength. The merged optical path may be deflected by an angle mirror. The mirror may be chosen as, but is not limited to, silver coated mirror, or any other coating that is able to reflect electromagnetic energy in the visible spectrum and in the IR spectrum. The FOV may depend on the total OP distance travelled from the sensor to the areas that printing activities happened, the size of the beamsplitter and deflector; and the lens or lenses used.

The in-situ monitoring system presented here provides a holistic approach for the inspection of a DED process. This system can capture a range of DED process defects (anomalies) by using the combination of sensor fusion methodology. Another challenge of in-situ monitoring system is the calibration of sensors with reference to specific materials and process parameters. The present invention also addresses this essential aspect of DED monitoring system by establishing procedures for data acquisition and calibration thermal signal with respect to materials and process parameters. Furthermore, the use of accelerometer and gyroscope sensors enables the ability to reconstruct the printing path and identify defect locations within the workpiece geometry.

As explained above, the disclosure has several advantages. The combination of sensor fusion methodology allows simultaneous detection of different types of anomalies occurred during DED process. For example, the use of IR sensor in conjunction with optical sensor allows detection of overheated areas induced residue stresses, cracking and delamination as well as defect signatures of porosity, surface unevenness, geometric inaccuracy and microstructure inhomogeneity.

The fast and robust algorithms provided herein for image analysis of anomalies from the acquired images allows real-time quality control of the build process. The image processing method developed in this disclosure includes correlations between an image of the inspected layer and those of the previously printed ones, as well as between an image of the inspected layer and a reference layer having no defect (for PBF), or for different fused workpiece layers (for DED). Therefore, it provides a realistic identification of anomalies occurred during the manufacturing process.

The sensor setup can be integrated without any significant modification of existing PBF or DED systems. Adoption of the proposed monitoring system enables anomaly detection and response, closed-loop control, and feature-driven control for the manufacturing systems.

In summary, current available monitoring systems are mainly developed for a particular process defect. In contrast, the present disclosure provides a comprehensive approach for monitoring a range of process signatures in 3D printing manufacturing system. The proposed in-situ monitoring system can provide a holistic approach for the inspection of 3D printing processes by exploiting the sensor fusion methodology. It is capable of correlating the measurements from various defect signatures with quality-control metric of the built part (e.g. density and hardness and tensile strength). Furthermore, the present disclosure is system independent and does not require modifications of the optical components in existing PBF systems, making it flexible for installation. Also, since the discovery of structural weakness using post-process inspection methods on the manufactured part is costly in term of the resources, money and time invested, the present disclosure helps to improve the 3D printing manufacturing process's stability and quality management by in-situ detection of critical errors and identification of defect signatures.

While the disclosure has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

CITED REFERENCES (1). J.-P. Kruth, and P. Mercelis, "Procedure and apparatus for in-situ monitoring and feedback control of Selective Laser Powder processing," U.S. Patent Application No. 2009/0206065 A1.

(2). Y. Chivel, "Optical in-process temperature monitoring of selective laser melting," *Physics Procedia, vol.* 41, pp. 904-910, 2013.

(3). Yadroitsev, P. Krakhmalev, and I. Yadroitsava, "Selective laser melting of Ti6Al4V alloy for biomedical applications: Temperature monitoring and microstructural evolution," *Journal of Alloys and Compounds*, vol. 583, pp. 404-409, 2014.
(4). P. Lott, H. Schleifenbaum, W. Meiners, K. Wissenbach, C. Hinke, and J. Biltmann, "Design of an optical system for the in situ process monitoring of selective laser melting (SLM)," *Physics Procedia*, vol. 12, pp. 683-690, 2011.
(5). U. Thombansen, A. Gatej, and M. Pereira, "Process observation in fiber laser-based selective laser melting," *Optical Engineering*, vol. 54, no. 1, pp. 011008, 2014.
(6). H. Krauss, T. Zeugner, and M. F. Zaeh, "Layerwise monitoring of the selective laser melting process by thermography," *Physics Procedia*, vol. 56, pp. 64-71, 2014.
(7). B. Lane, S. Moylan, E. P. Whitenton, and L. Ma, "Thermographic measurements of the commercial laser powder bed fusion process at NIST," *Rapid prototyping journal*, vol. 22, no. 5, pp. 778-787, 2016.
(8). J. zur Jacobsmühlen, S. Kleszczynski, G. Witt, and D. Merhof, "Elevated region area measurement for quantitative analysis of laser beam melting process stability."
(9). M. Grasso, V. Laguzza, Q. Semeraro, and B. M. Colosimo, "In-process monitoring of selective laser melting: Spatial detection of defects via image data analysis," *Journal of Manufacturing Science and Engineering*, vol. 139, no. 5, pp. 051001, 2017.
(10). Scott A. G. and Thomas G. S. (2017) United States Patent Application No. US2017/0146488 A1.
(11). M. Mani, S. Feng, B. Lane, A. Donmez, S. Moylan, [1]R. Fesperman, *"Measurement science needs for real-time control of additive manufacturing powder bed fusion processes"* US Department of Commerce, National Institute of Standards and Technology, 2015.
(12). Takushima, S., et al., *Optical in-process height measurement system for process control of laser metal-wire deposition.* Precision Engineering, 2020. 62: p. 23-29.
(13). Heralić, A., A.-K. Christiansson, and B. Lennartson, *Height control of laser metal-wire deposition based on iterative learning control and 3D scanning.* Optics and lasers in engineering, 2012. 50(9): p. 1230-1241.
(14). Donadello, S., et al., *Monitoring of laser metal deposition height by means of coaxial laser triangulation.* Optics and Lasers in Engineering, 2019. 112: p. 136-144.
(15). Hua, T., et al., *Research on molten pool temperature in the process of laser rapid forming.* Journal of Materials Processing Technology, 2008. 198(1-3): p. 454-462.
(16). Yu, J., et al., *Mechanics and energy analysis on molten pool spreading during laser solid forming.* Applied Surface Science, 2010. 256(14): p. 4612-4620.
(17). Nassar, A. R., et al., *Intra-layer closed-loop control of build plan during directed energy additive manufacturing of Ti-6Al-4V* Additive Manufacturing, 2015. 6: p. 39-52.
(18). Hu, D. and R. Kovacevic, *Sensing, modeling and control for laser-based additive manufacturing.* International Journal of Machine Tools and Manufacture, 2003. 43(1): p. 51-60.
(19). Zalameda, J. N., et al. *Thermal imaging for assessment of electron-beam freeform fabrication (EBF3) additive manufacturing deposits.* in *Thermosense: Thermal Infrared Applications XXXV.* 2013. International Society for Optics and Photonics.
(20). Liu, S., et al., *Real-time monitoring of laser hot-wire cladding of Inconel 625.* Optics & Laser Technology, 2014. 62: p. 124-134.

The invention claimed is:

1. A monitoring system for in-situ identification of anomalies of a workpiece in a 3D printing manufacturing process, the monitoring system comprising:
 a processor;
 an optical sensor having an optical path;
 an infrared (IR) sensor having an IR path;
 an optical device configured to merge the optical path and the IR path to obtain a merged optical path, the merged optical path arranged to be directed to the workpiece during a first stage of the 3D printing manufacturing process to obtain a first perception data;
 wherein the processor is configured to identify the anomalies of the workpiece based on the first perception data, and
 wherein the processor is further configured to segment the first perception data into foreground anomaly features and background anomaly features, and further configured to determine a type of anomaly based on at least one of the foreground anomaly features and the background anomaly features.

2. The monitoring system of claim 1, wherein the processor is further configured to process the at least one of the foreground anomaly features and the background anomaly features prior to determining the type of anomaly by one of:
 (i) pixel enhancement of the at least one of the foreground anomaly features and the background anomaly features; and
 (ii) obtaining pixel difference between the at least one of the foreground anomaly features and the background anomaly features and a reference perception data.

3. The monitoring system of claim 2, wherein the pixel enhancement of the at least one of the foreground anomaly features and the background anomaly features is one of: (i) high value pixels enhancement and (ii) low value pixels enhancement.

4. The monitoring system of claim 1, wherein the processor is further configured to:
 (a) obtain a second perception data when the merged optical path is directed to the workpiece during a second stage of the 3D printing manufacturing process, and further configured to identify the anomalies of the workpiece based on the second perception data; and
 (b) identify the type of anomaly based on both the first perception data and the second perception data.

5. The monitoring system of claim 4,
 (a) wherein the 3D printing manufacturing process is a powder bed fusion process and wherein the first stage of the 3D printing manufacturing process is after a coated powder layer is deposited and before a laser scanning fusion of the coated powder layer, or
 (b) wherein the second stage is after the laser scanning fusion of the coated powder layer and:
  (i) before a next coated powder layer is deposited, or
  (ii) after the next coated powder layer is deposited and before a next laser scanning fusion of the next coated powder layer, or
 (c) any combination of the above.

6. The monitoring system of claim 4, wherein the first perception data and/or the second perception data comprises an optical image and an IR image, and the processor is further configured to align the optical image and the IR image via corner detection of each of the optical image and the IR image prior to identify the anomalies of the workpiece.

7. The monitoring system of claim 6, wherein the processor is configured to identify two or more different types of anomalies of the workpiece from the optical image and the IR image.

8. The monitoring system of claim 1, further comprising a memory configured to store historical perception data, wherein the processor is configured to employ a deep learning model to predict quality of the workpiece based on the historical perception data.

9. The monitoring system of claim 1,
(a) wherein the workpiece comprises a plurality of layers, and the processor is configured to identify the anomalies in at least one layer of the plurality of layers, or
(b) wherein the 3D printing manufacturing process is a powder bed fusion process, or a directed energy deposition process, or
(c) any combination of the above.

10. A method of in-situ identification of anomalies of a workpiece in a 3D printing manufacturing process, the method comprising steps of:
merging an optical path of an optical sensor and an infrared (IR) path of an IR sensor using an optical device to obtain a merged optical path;
directing the merged optical path to the workpiece during a first stage of the 3D printing manufacturing process to obtain a first perception data;
identifying the anomalies of the workpiece based on the first perception data using a processor, wherein the method further comprises:
segmenting the first perception data into foreground anomaly features and background anomaly features using the processor; and
determining a type of anomaly based on at least one of the foreground anomaly features and the background anomaly features.

11. The method of claim 10, further comprising:
processing the at least one of the foreground anomaly features and the background anomaly features prior to determining the type of anomaly by one of:
(i) enhancing pixels of the at least one of the foreground anomaly features and the background anomaly features; and
(ii) obtaining pixel difference between the at least one of the foreground anomaly features and the background anomaly features and a reference perception data.

12. The method of claim 11, wherein enhancing the pixels of the at least one of the foreground anomaly features and the background anomaly features comprises steps of one of:
(i) enhancing high value pixels; and
(ii) enhancing low value pixels.

13. The method of claim 10, further comprising:
obtaining a second perception data when the merged optical path is directed to the workpiece during a second stage of the 3D printing manufacturing process;
identifying the anomalies of the workpiece based on the second perception data using the processor; and
identifying the type of anomaly based on both the first perception data and the second perception data.

14. The method of claim 13,
(a) wherein the 3D printing manufacturing process is a powder bed fusion process and wherein the first stage of the 3D printing manufacturing process is after a coated powder layer is deposited and before a laser scanning fusion of the coated powder layer, or
(b) wherein the second stage is after the laser scanning fusion of the coated powder layer and:
(i) before a next coated powder layer is deposited, or
(ii) after the next coated powder layer is deposited and before a next laser scanning fusion of the next coated powder layer, or
(c) any combination of the above.

15. The method of claim 13, further comprising:
aligning an optical image and an IR image of the first perception data and/or the second perception data via corner detection of each of the optical image and the IR image prior to identifying the anomalies of the workpiece.

16. The method of claim 15, further comprising:
identifying two or more different types of anomalies of the workpiece from the optical image and the IR image.

17. The method of claim 10, further comprising:
predicting quality of the workpiece using a deep learning model based on historical perception data stored in a memory.

18. The method of claim 10,
(a) wherein the workpiece comprises a plurality of layers, and the processor is configured to identify the anomalies in at least one layer of the plurality of layers, or
(b) wherein the 3D printing manufacturing process is a powder bed fusion process or a directed energy deposition process, or
(c) any combination of the above.

* * * * *